(12) United States Patent
Ando et al.

(10) Patent No.: US 9,103,981 B2
(45) Date of Patent: Aug. 11, 2015

(54) METHOD FOR DESIGNING AND METHOD FOR MANUFACTURING DIFFRACTION-GRATING LENS

(75) Inventors: Takamasa Ando, Osaka (JP); Tsuguhiro Korenaga, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 291 days.

(21) Appl. No.: 13/818,160

(22) PCT Filed: Dec. 9, 2011

(86) PCT No.: PCT/JP2011/006882
§ 371 (c)(1),
(2), (4) Date: Feb. 21, 2013

(87) PCT Pub. No.: WO2012/077351
PCT Pub. Date: Jun. 14, 2012

(65) Prior Publication Data
US 2013/0145608 A1    Jun. 13, 2013

(30) Foreign Application Priority Data
Dec. 10, 2010   (JP) .................................. 2010-276231

(51) Int. Cl.
*G02B 5/18*   (2006.01)
*G02B 13/18*  (2006.01)
(Continued)

(52) U.S. Cl.
CPC ................ *G02B 5/1847* (2013.01); *G02B 3/04* (2013.01); *G02B 5/1814* (2013.01); *G02B 13/00* (2013.01); *G02B 13/003* (2013.01); *G02B 13/18* (2013.01); *Y10T 29/49* (2015.01);
(Continued)

(58) Field of Classification Search
CPC ........ G02B 13/18; G02B 13/003; G02B 3/04; G02B 13/00; G02B 5/1814; G02B 5/1847; G02B 27/42; Y10T 29/49; Y10T 29/49764; Y10T 29/49767; Y10T 29/49771
See application file for complete search history.

(56) References Cited

U.S. PATENT DOCUMENTS

| 5,132,843 A | 7/1992 | Aoyama et al. |
| 5,629,799 A | 5/1997 | Maruyama et al. |
| 5,847,877 A | 12/1998 | Imamura et al. |

(Continued)

FOREIGN PATENT DOCUMENTS

| JP | 09-127321 A | 5/1997 |
| JP | 10-213744 A | 8/1998 |

(Continued)

OTHER PUBLICATIONS

International Search Report for corresponding International Application No. PCT/JP2011/006882 mailed Mar. 13, 2012.

(Continued)

*Primary Examiner* — John C Hong
(74) *Attorney, Agent, or Firm* — Renner, Otto, Boisselle & Sklar, LLP

(57) ABSTRACT

A method for designing a diffraction grating lens of the present invention is a method for designing a diffraction grating lens having a diffraction grating composed of a plurality of diffraction zones, the method including the steps of: (a) determining widths of the plurality of diffraction zones; and (b) determining an aspherical coefficient of a diffraction surface on which the diffraction grating is provided while the determined widths of the plurality of diffraction zones are fixed, after the step (a).

13 Claims, 22 Drawing Sheets

(51) Int. Cl.
*G02B 13/00* (2006.01)
*G02B 3/04* (2006.01)

(52) U.S. Cl.
CPC ..... *Y10T 29/49764* (2015.01); *Y10T 29/49767* (2015.01); *Y10T 29/49771* (2015.01)

(56) References Cited

U.S. PATENT DOCUMENTS

| | | | |
|---|---|---|---|
| 6,275,342 | B1 | 8/2001 | Sakamoto et al. |
| 7,333,416 | B2 * | 2/2008 | Saito et al. ............... 369/112.08 |
| 2003/0016447 | A1 | 1/2003 | Kato et al. |
| 2009/0225215 | A1 | 9/2009 | Korenaga et al. |
| 2011/0096400 | A1 | 4/2011 | Ando et al. |
| 2011/0102898 | A1 | 5/2011 | Korenaga et al. |

FOREIGN PATENT DOCUMENTS

| | | |
|---|---|---|
| JP | 10-301026 A | 11/1998 |
| JP | 11-352317 A | 12/1999 |
| JP | 2004-212555 A | 7/2004 |
| JP | 2006-162822 A | 6/2006 |
| WO | 2009/153953 A1 | 12/2009 |
| WO | 2010/073573 A1 | 7/2010 |

OTHER PUBLICATIONS

International Preliminary Report on Patentability for corresponding International Application No. PCT/JP2011/006882 mailed Oct. 9, 2012.

* cited by examiner

STEP 1 — DETERMINE PHASE FUNCTION OF DIFFRACTION GRATING

STEP 2 — DETERMINE ASPHERICAL COEFFICIENT OF DIFFRACTION SURFACE WHILE PHASE FUNCTION IS FIXED (a) PHASE FUNCTION Φ

(b) Φ'

(c) Φ''

(a)

(b)

(c)

SPHERICAL ABERRATION
CHROMATIC ABERRATION

ASTIGMATISM
FIELD CURVATURE

DISTORTION ABERRATION

SPHERICAL ABERRATION
CHROMATIC ABERRATION

ASTIGMATISM
FIELD CURVATURE

DISTORTION ABERRATION

SPHERICAL ABERRATION
CHROMATIC ABERRATION

ASTIGMATISM
FIELD CURVATURE

DISTORTION ABERRATION

SPHERICAL ABERRATION
CHROMATIC ABERRATION

ASTIGMATISM
FIELD CURVATURE

DISTORTION ABERRATION (a) BASE ASPHERICAL SHAPE (b) PHASE FUNCTION (c) DIFFRACTION GRATING SURFACE SHAPE
(BASE ASPHERICAL SHAPE + PHASE FUNCTION)

(a)                    (b)

METHOD FOR DESIGNING AND METHOD FOR MANUFACTURING DIFFRACTION-GRATING LENS

TECHNICAL FIELD

The present invention relates to a method for designing a diffraction grating lens (diffraction optical element) for condensing or diverging light by utilizing diffraction phenomenon, and a method for manufacturing the same.

BACKGROUND ART

It is widely known that a diffraction grating lens whose surface has a pattern of diffraction zones is superior in correcting lens aberrations, such as field curvature and chromatic aberration (misalignment of convergence points between different wavelengths). This is because a diffraction grating has peculiar characteristics, such as inverse dispersiveness and abnormal dispersiveness, providing a significant chromatic aberration correcting capability. In a case where a diffraction grating is used in an image pickup optical system, as compared to an image pickup optical system formed only by an aspherical lens, it is possible to reduce the number of lenses for the same performance. Therefore, it is possible to reduce the manufacturing cost and to shorten the optical length, thus allowing for reduction in height.

FIG. 30 shows a method for deriving a diffraction grating surface shape of a diffraction grating lens. Note that a diffraction grating lens is designed primarily by the phase function method or the high refractive index method. While the phase function method will be discussed herein, the same results are obtained eventually also when the design is done by a high refractive index method. A diffraction grating lens is formed by an aspherical shape (FIG. 30(a)), which is the base shape, and a diffraction grating shape determined by the phase function (FIG. 30(b)). The phase function is represented by Exp. 1 below.

$$\phi(r) = \frac{2\pi}{\lambda_0} \psi(r) \quad \text{[Exp. 1]}$$
$$\psi(r) = a_1 r + a_2 r^2 + a_3 r^3 + a_4 r^4 + a_5 r^5 + a_6 r^6 + \ldots + a_i r^i$$
$$(r^2 = x^2 + y^2)$$

In Exp. 1, $\phi$ is the phase function, $\Psi$ is the optical path difference function, r is the distance in the radial direction from the optical axis, $\lambda_0$ is the design wavelength, and $a_1$, $a_2$, $a_3$, $a_4$, $a_5$, $a_6$, ... $a_i$ are coefficients.

In the case of a diffraction grating utilizing first-order diffraction light, one diffraction zone is arranged each time the phase is equal to $2\pi$ in the phase function $\phi(r)$, as shown in FIG. 30(b). The diffraction grating surface shape is determined as shown in FIG. 30(c) by adding the phase shape which has been cut into pieces arranged every $2\pi$, to the aspherical shape of FIG. 30(a). Specifically, the value of the phase function of FIG. 30(b) is converted so that the step height 241 of the diffraction zone forming portion satisfies Exp. 2 below, and is added to the aspherical shape of FIG. 30(a).

$$d = \frac{m_0 \cdot \lambda}{n_1(\lambda) - 1} \quad \text{[Exp. 2]}$$

Herein, $m_o$ is the design order ($m_o=1$ for first-order diffraction light), $\lambda$ is the working wavelength, d is the step height of the diffraction grating, and $n_i(\lambda)$ is the refractive index of the lens base at the working wavelength $\lambda$ and is a function of the wavelength. With such a diffraction grating that satisfies Exp. 2, the phase difference is $2\pi$ between the base and the tip of the diffraction step portion, and the diffraction efficiency of first-order diffraction light for single-wavelength light (hereinafter referred to as the "first-order diffraction efficiency") can be substantially 100%.

In accordance with Exp. 2, the value d changes, for which the diffraction efficiency becomes 100% as the wavelength $\lambda$ varies. That is, if the value d is fixed, the diffraction efficiency does not become 100% at wavelengths other than the wavelength $\lambda$ which satisfies Exp. 2. However, where a diffraction grating lens is used in a general photograph-taking application, it is necessary to diffract light over a wide wavelength range (e.g., the visible light range from a wavelength of about 400 nm to about 700 nm, etc.). Therefore, there occurs diffraction light 256 of an unnecessary order (hereinafter referred to also as the "unnecessary-order diffraction light") in addition to the main, first-order diffraction light 255, as shown in FIG. 31. For example, if the wavelength with which the step height d is determined is set to the green wavelength (e.g., 540 nm), although the first-order diffraction efficiency at the green wavelength is 100% and there occurs no unnecessary-order diffraction light 256 of the green wavelength, the first-order diffraction efficiency is not 100% at the red wavelength (e.g., 640 nm) or the blue wavelength (e.g., 440 nm) and there occurs zero-order diffraction light of red or second-order diffraction light of blue. The zero-order diffraction light of red or the second-order diffraction light of blue is the unnecessary-order diffraction light 256, which may spread across the image surface in the form of a flare or a ghost to deteriorate the image or may lower the MTF (Modulation Transfer Function) characteristics. Only second-order diffraction light is shown in FIG. 31 as the unnecessary-order diffraction light 256.

It is possible to suppress the occurrence of the unnecessary-order diffraction light 256 by applying or attaching, as an optical adjustment film 261, an optical material having a different refractive index and a different refractive index dispersion from a lens base 251 onto the surface on which a diffraction grating 252 has been formed, as shown in FIG. 32. Patent Document No. 1 discloses an example in which the wavelength dependency of the diffraction efficiency is reduced by setting the refractive index of the base material on which the diffraction grating 252 has been formed and the refractive index of the optical adjustment film 261 formed to cover the diffraction grating 252 so as to satisfy a particular condition. Then, it is possible to eliminate the flare due to the unnecessary-order diffraction light 256 as shown in FIG. 31.

Patent Document No. 2 discloses providing a light-absorbing portion in the vicinity of the base portion of the slope surface of a diffraction zone, thereby blocking the reflected light from the step surface by the light-absorbing portion, in order to prevent the reflected light at a step surface 262 of the diffraction grating 252 from passing through the blazed surface and becoming flare light.

When designing a diffraction grating lens, it is common to vary and optimize simultaneously the phase function of the diffraction grating surface and the aspherical shape thereof as parameters. This is because the optical performance of the diffraction grating lens as a whole is not determined by adding together the phase function and the aspherical shape as separate parameters, but is determined as a result of these parameters influencing each other in a complicated manner. Thus, designing a lens while simultaneously optimizing the phase function and the aspherical shape is expected to improve the image-capturing performance as compared with a case where the phase function and the aspherical shape are individually optimized one after another.

CITATION LIST

Patent Literature

Patent Document No. 1: Japanese Laid-Open Patent Publication No. H09-127321
Patent Document No. 2: Japanese Laid-Open Patent Publication No. 2006-162822

SUMMARY OF INVENTION

Technical Problem

The present inventor found that there occurs fringe flare light different from the unnecessary-order diffraction light 256 when the widths of the diffraction zones on the diffraction grating surface of the diffraction grating lens are increased or when capturing an image of an object of a very high optical intensity. It has not been known that such fringe flare light occurs with a diffraction grating lens. The present inventor also found that fringe flare light may possibly significantly lower the quality of the captured image under certain conditions.

With conventional methods for designing a diffraction grating lens, the phase function and the aspherical shape are optimized simultaneously, and one cannot know the widths and the number of zones of the diffraction grating until the designing is complete. As the present inventor actually examined the designing of a diffraction grating lens, the power of the phase function tended to become high, thereby decreasing the widths of the diffraction zones and making it difficult to machine. In view of this, the present inventor examined controlling the minimum width of the diffraction zones in the designing step in order to prevent the widths of the diffraction zones from becoming too small. However, when designing with a limitation on the minimum width of the diffraction zones, there was a problem that widths of diffraction zones become equal at the minimum value. When the diffraction grating surface is composed of diffraction zones of the same width, fringe flare light will be emphasized, deteriorating the image quality.

The present invention has been made to solve such problems, and an object thereof is to provide a method for designing a diffraction grating lens with which the occurrence of fringe flare light is suppressed and which can be machined easily, and a method for manufacturing the same.

Solution to Problem

A method for designing a diffraction grating lens of the present invention is a method for designing a diffraction grating lens having a diffraction grating composed of a plurality of diffraction zones, the method including the steps of: (a) determining respective widths of the plurality of diffraction zones; and (b) determining an aspherical coefficient of a diffraction surface on which the diffraction grating is provided while the determined respective widths of the plurality of diffraction zones are fixed, after the step (a).

A method for designing an image pickup optical system of the present invention is a method for designing an image pickup optical system including: a diffraction grating lens having a diffraction grating composed of a plurality of diffraction zones; a spherical surface or an aspherical lens; and a stop, the method including the steps of: (a) determining respective widths of the plurality of diffraction zones; and (b) determining an aspherical coefficient of a diffraction surface on which the diffraction grating is provided while the determined respective widths of the plurality of diffraction zones are fixed, after the step (a).

Advantageous Effects of Invention

According to the present invention, it is possible to independently determine the widths of the diffraction zones (the coefficient of the phase function) in step (a). In step (a), the width of the diffraction zone can be set to a value within a range where machining is easy and such that there is little fringe flare light. In step (b), the aspherical coefficient can be determined while the widths of the diffraction zones obtained in step (a) are kept unchanged. Therefore, it is possible to design and manufacture a diffraction grating lens that has little fringe flare light and that can be machined easily.

DESCRIPTION OF EMBODIMENTS

First, fringe flare light which occurs through a diffraction grating lens discovered by the present inventor will be described.

Figure 33:
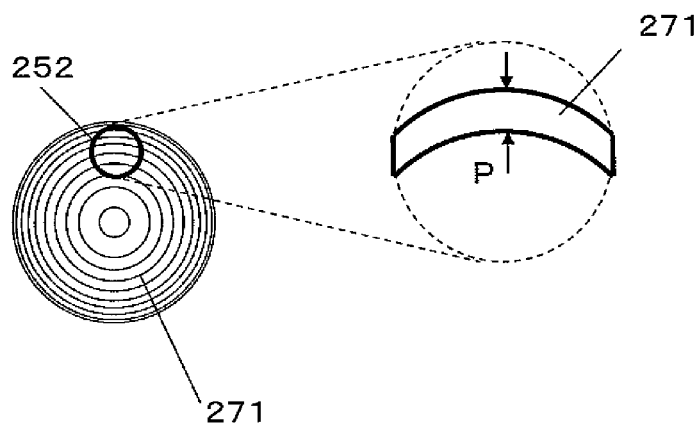
FIG. 33 A diagram showing zones of a diffraction grating lens as viewed from the optical axis direction.
Figure 34:
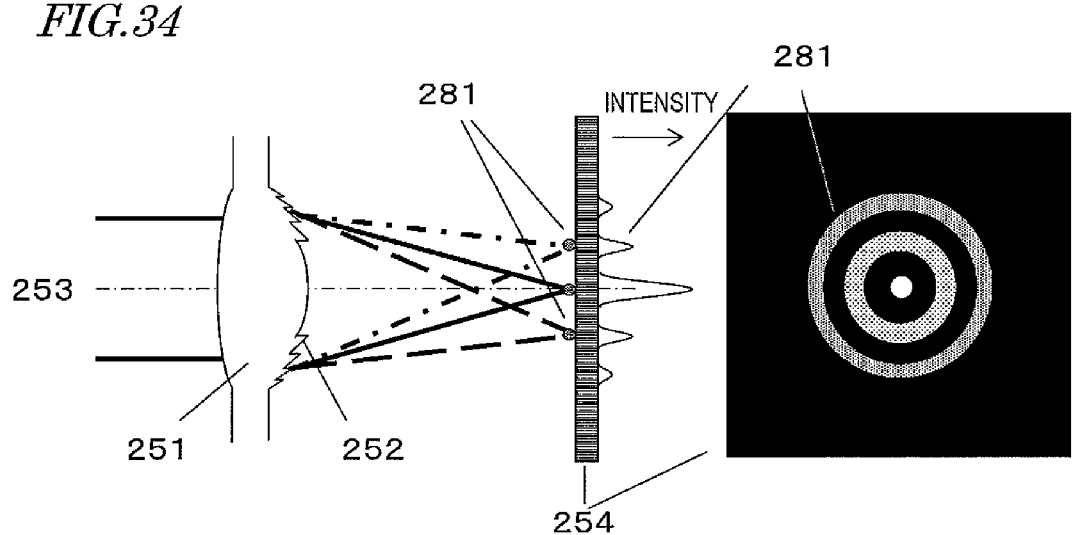
FIG. 34 A diagram illustrating how fringe flare light occurs with a diffraction grating lens.

As shown in FIG. 33, each diffraction zone 271 is sandwiched between step surfaces arranged in a concentric pattern in a diffraction grating lens including the diffraction grating 252 provided thereon. Therefore, the wave front of light passing through two adjacent diffraction zones 271 is divided by the step surface between the diffraction zones 271. Light passing through each diffraction zone 271 can be regarded as light passing through a slit having a width P of the diffraction zone 271. Typically, it is possible to desirably correct aberrations by decreasing the width P. However, when the width of the diffraction zone 271 decreases, light passing through the diffraction grating lens can be regarded as light passing through very narrow slits arranged in a concentric pattern, whereby the phenomenon in which light wave fronts spread out can be seen in the vicinity of the step surfaces. FIG. 34 schematically shows how light enters the lens base 251 including the diffraction grating 252 provided thereon, and how the output light is diffracted by the diffraction grating 252.

Typically, light passing through slits having a very narrow width P forms diffraction fringes at a point of observation at infinity. This is called Fraunhofer diffraction. This diffraction phenomenon occurs also at a finite distance (e.g., the focal plane) by including a lens system having a positive focal distance.

Figure 35:
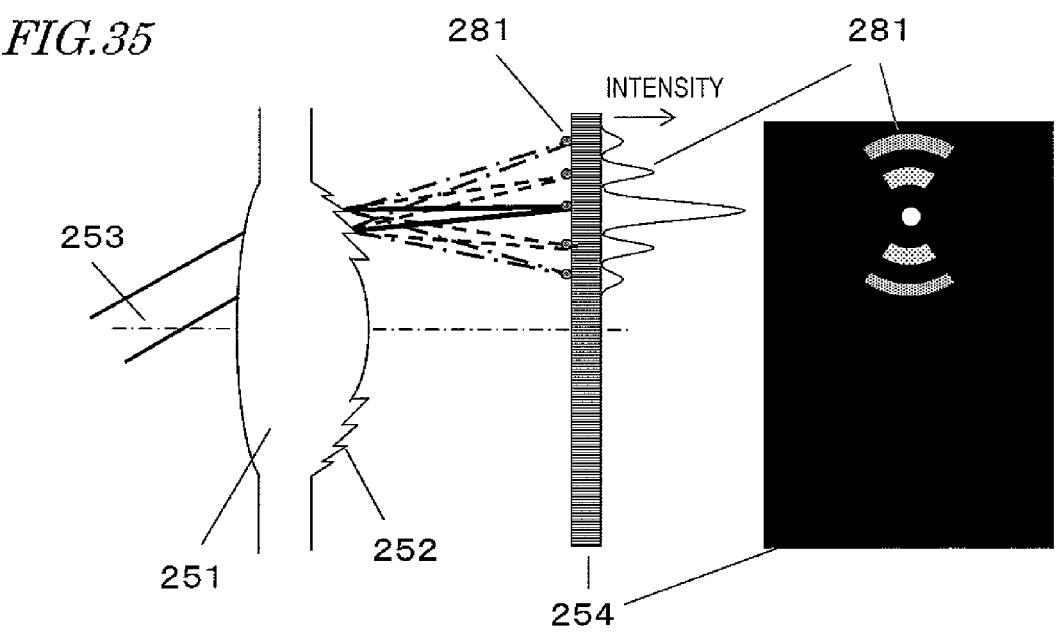
FIG. 35 A diagram illustrating how fringe flare light occurs with a diffraction grating lens.

The present inventor confirmed, by image evaluation using an actual lens, that as the width the diffraction zone 271 decreases, light passing through the zones interfere with one another, resulting in the fringe flare light 281 which spreads in a concentric pattern as shown in FIG. 34. The present inventor also confirmed, by image evaluation using an actual lens, that for light that is incident diagonally with respect to the optical axis and passing through only portions of diffraction zones, the fringe flare light 281 may occur which has a shape like a butterfly with its wings spread out, for example, as shown in FIG. 35.

The fringe flare light 281 appears pronounced when the image pickup optical system receives light of a greater intensity than incident light that causes the unnecessary-order diffraction light 256 conventionally known in the art. It also became clear, through an in-depth examination, while the unnecessary-order diffraction light 256 does not occur for particular wavelengths, the fringe flare light 281 occurs across the entire working wavelength range including the design wavelength.

The fringe flare light 281 spreads on the image to be even larger than the unnecessary-order diffraction light 256, thus deteriorating the image quality. Particularly, under a phototaking environment with a high contrast ratio, e.g., where a bright object such as a light is photographed against a completely dark background such as at night, the fringe flare light 281 is particularly conspicuous and problematic. Since the bright/dark pattern of the fringe flare light 281 is clearly-defined in a fringe-shaped pattern, it is more conspicuous on the image and significantly problematic than the unnecessary-order diffraction light 256.

Figure 36:
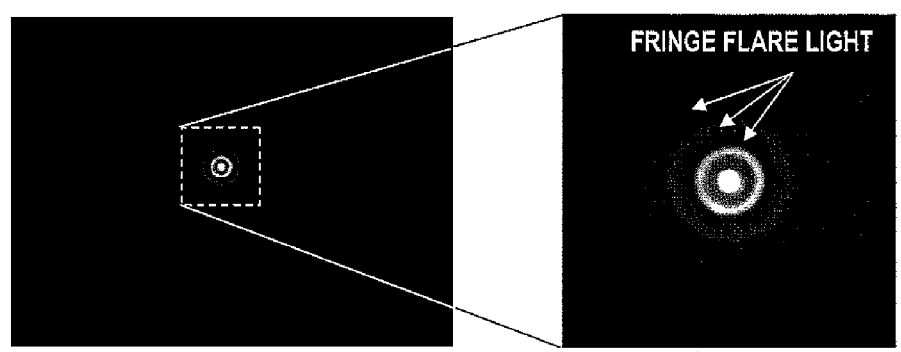
FIGS. 36 (a) and (b) are diagrams showing an example of an image captured using an image pickup apparatus having a conventional diffraction grating lens.

FIG. 36(a) shows an example of an image taken by using an image pickup apparatus including a conventional diffraction grating lens. The image shown in FIG. 36(a) is an image obtained by capturing an image of a point source with the room light turned off. FIG. 36(b) is an enlarged image of a portion of the image shown in FIG. 36(a) in the vicinity of the point source. In FIG. 36(b), the bright/dark pattern ring-shaped image which can be seen around the point source is the fringe flare light 281.

Specific embodiments of the present invention will now be described with reference to the drawings.

Embodiment 1

Figures 1, 2:
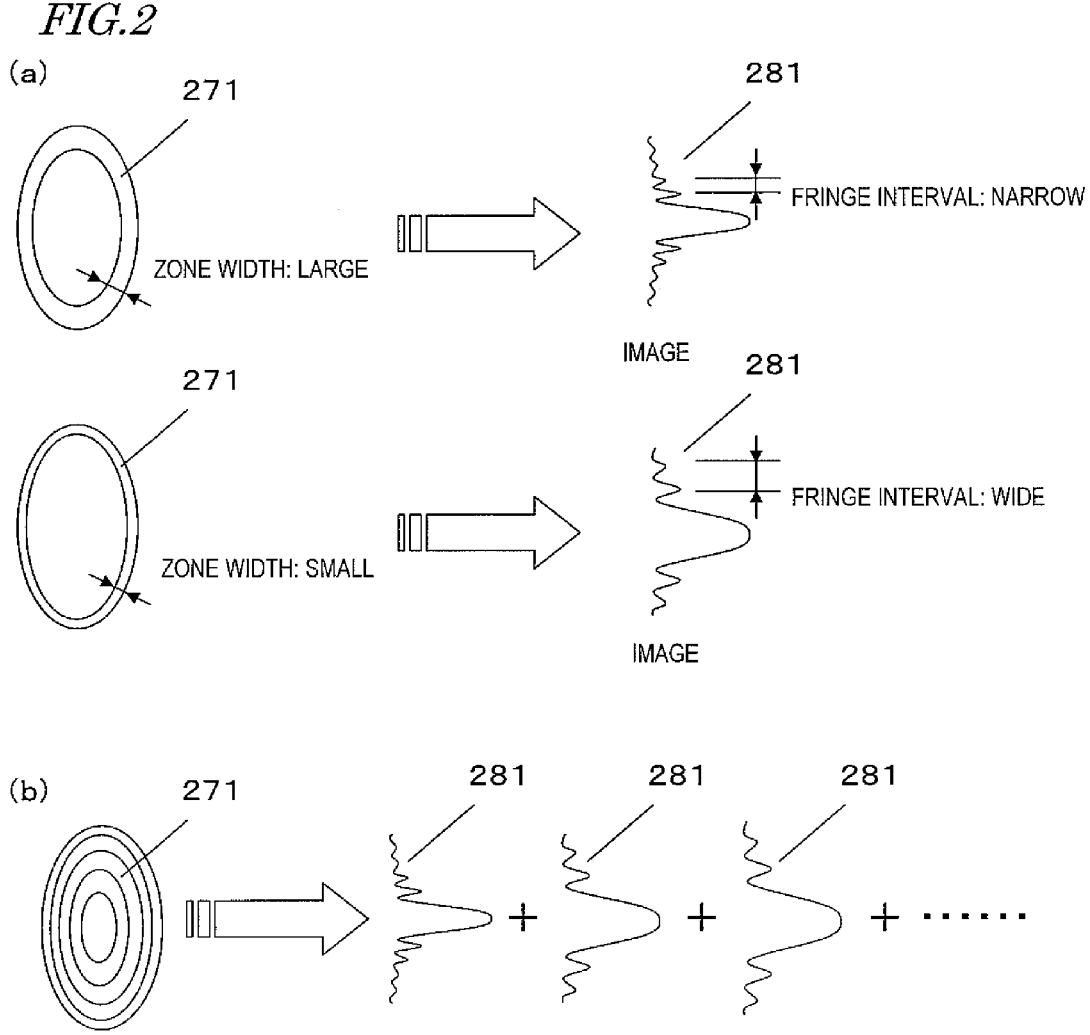
FIG. 1 A flow chart showing Embodiment 1 of a design method according to the present invention.
FIGS. 2 (a) and (b) are diagrams illustrating the relationship between the width of a diffraction zone and the fringe interval of fringe flare light 281.
Figure 30:
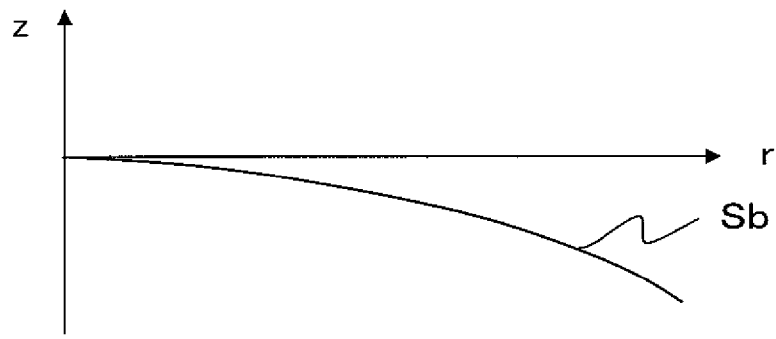
FIG. 30 (a) to (c) are diagrams illustrating a method for deriving a diffraction grating surface shape of a diffraction grating lens.
Figure 30:
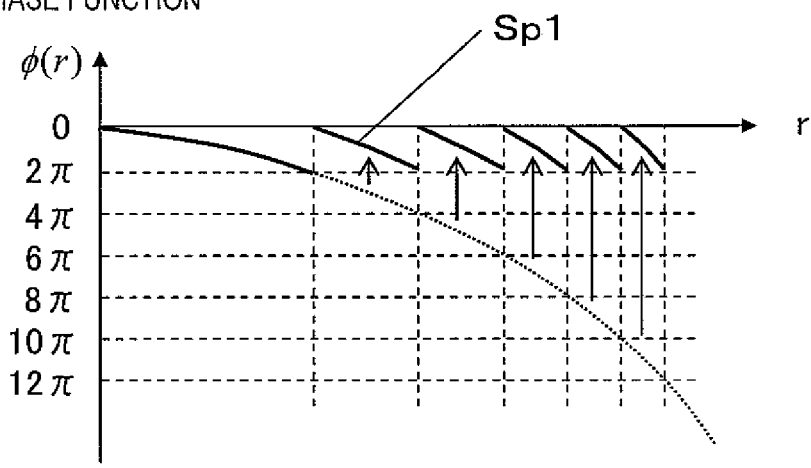
Figure 30:
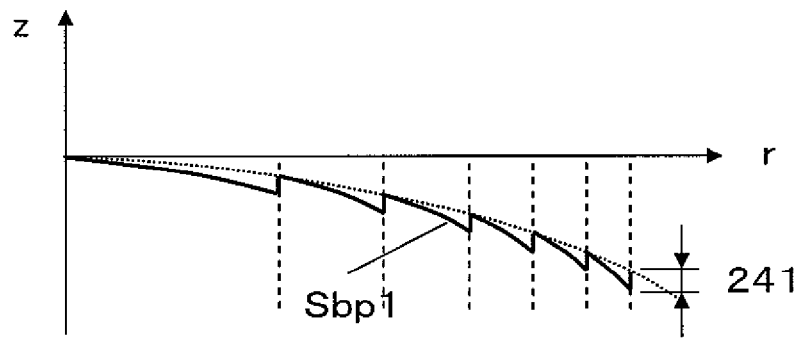
Figure 31:
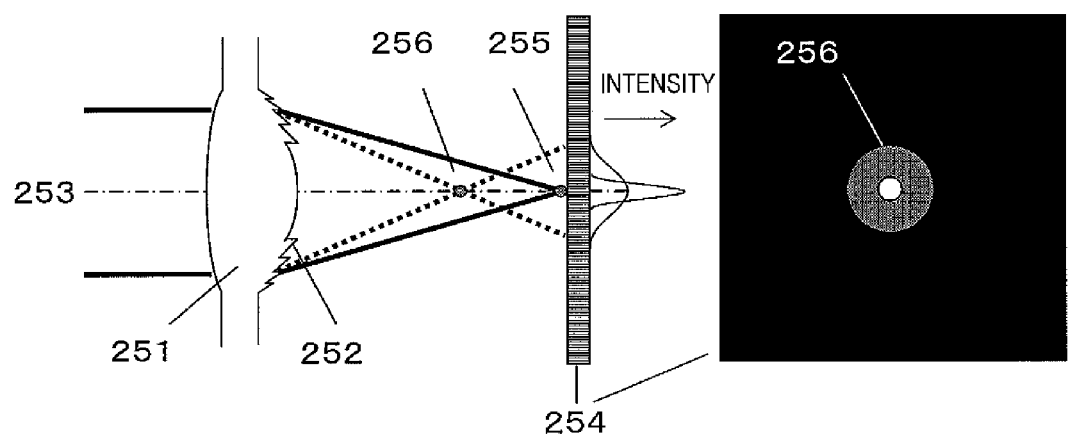
FIG. 31 A diagram illustrating how unnecessary diffraction light occurs with a diffraction grating lens.
Figure 32:
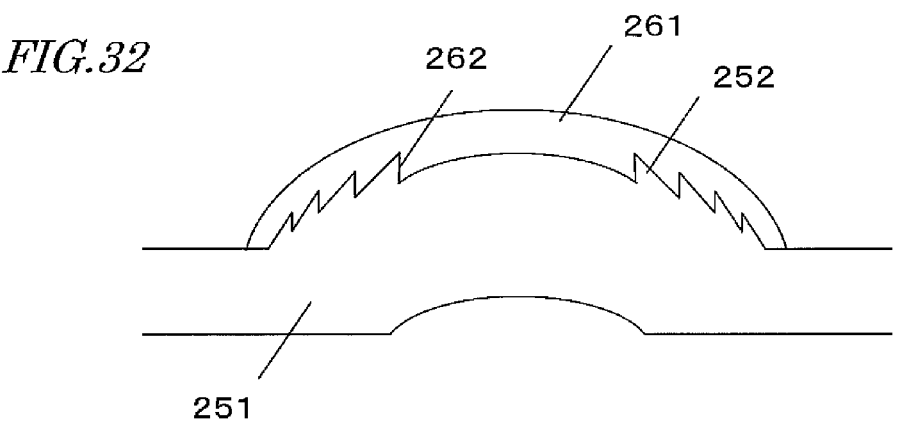
FIG. 32 A cross-sectional view showing a diffraction grating lens with an optical adjustment film formed thereon.

FIG. 1 is a flow chart showing one embodiment of a method for designing a diffraction grating lens according to the present invention. In an image pickup optical system including a diffraction grating, first, as Step 1, the widths of a plurality of diffraction zones of the diffraction grating 252 are determined. As described above with reference to FIG. 30(b), one diffraction zone is arranged each time the phase is equal to 2π in the phase function φ(r). The width of the diffraction zone is determined once the gradient of the phase function φ(r) (the value of the coefficient of the phase function) is determined.

Next, as Step 2, the aspherical coefficient of the diffraction surface is optimized while the determined phase function is fixed, thus determining the aspherical coefficient.

Exp. 3 shows an expression of an aspherical shape in rotational symmetry. In Step 2, the coefficient Ai of Exp. 3 can be determined.

$$c = 1/r \qquad \text{[Exp. 3]}$$
$$h = (x^2 + y^2)^{1/2}$$
$$z = \frac{ch^2}{1 + \{1 - (k+1)c^2h^2\}^{1/2}} + A_4h^4 + A_6h^6 + A_8h^8 + A_{10}h^{10}$$

In Exp. 3, c is the paraxial curvature, r the paraxial radius of curvature, h the distance from the rotational symmetry axis, z the amount of sag of the aspherical surface (the distance from the xy plane to the aspherical surface), k the conic coefficient, and Ai the higher-order aspherical coefficient.

According to this method, in Step 1, it is possible to individually determine only the phase function. In Step 1, the width of the diffraction zone can be set to a value within a range where machining is easy and such that there is little fringe flare light. In Step 2, it is possible to determine the aspherical coefficient while keeping the width of the diffraction zone obtained in Step 1. Therefore, it is possible to design a diffraction grating lens that gives little fringe flare light and which can be machined easily.

In order to effectively suppress fringe flare light, the widths of a plurality of diffraction zones are set to be non-uniform in Step 1.

A specific method for setting the widths of a plurality of diffraction zones to be non-uniform will now be described.

As shown in FIG. 2(a), the fringe flare light 281 occurring from the diffraction zone 271 discovered by the present inventor is a fringe-shaped flare having a bright/dark pattern of intensity. The fringe interval of the fringe flare light 281 occurring from the diffraction zone 271 is in inverse relation to the width of the diffraction zone 271. The fringe interval of the fringe flare light 281 is narrowed as the width of the diffraction zone 271 is increased, whereas the fringe interval of the fringe flare light 281 is widened as the width of the diffraction zone 271 is decreased. An image on the image surface formed by a diffraction grating lens having a plurality of diffraction zones 271 is the result of superposing together the fringe flare light 281 occurring from the diffraction zones 271 as shown in FIG. 2(b). Therefore, if the diffraction zones 271 have an equal width, the fringe flare light 281 will occur at the same interval, thereby amplifying the bright/dark pattern of intensity. On the other hand, if the widths of the diffraction zones are set to be non-uniform, the flare light 281 occurring from the diffraction zones 271 within the effective diameter can be allowed to interfere with one another, thereby reducing the change through the bright/dark pattern of the fringe flare light 281 occurring from the entire diffraction grating lens.

Figure 3:
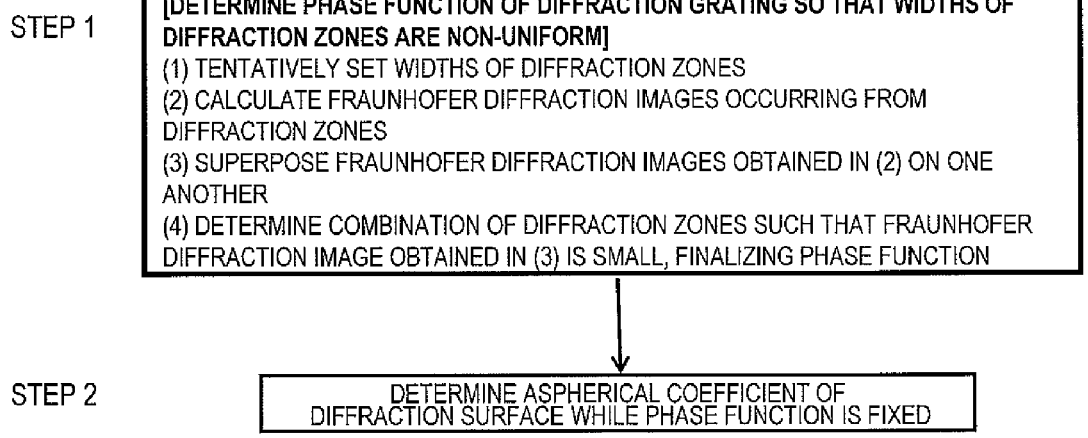
FIG. 3 A flow chart showing a specific design method of Embodiment 1.

As Step 1, specifically, the steps shown in FIG. 3 can be performed.

As the method for determining the widths of the diffraction zones, first, the widths of the diffraction zones 271 are set tentatively (Step 1-(1)). In this step, the distance (radius) from the optical axis to the zone position is obtained while adjusting (fitting) the coefficient of the phase function expression of Exp. 1. Then, the width of the diffraction zone can be obtained from the distance from the optical axis to the zone position. As for the propagation distance used when obtaining the Fraunhofer diffraction image, a desirable value for the diffraction grating lens to be designed is used.

In Step 1-(1), the widths of diffraction zones are set to be non-uniform.

An examination by the present inventor revealed that with conventional techniques, widths of diffraction zones particularly in areas farther away from the optical axis tend to become equal, of all the diffraction zones provided on the diffraction surface. In the present embodiment, by setting the widths of the diffraction zones to be non-uniform in Step 1, it is possible to design a diffraction grating lens that gives little fringe flare light.

The phrase "setting the widths of diffraction zones to be non-uniform" refers to diffraction zones that satisfy the phase function expression being generally non-uniform. Particularly, in the present invention, it is preferred that diffraction zones of larger distances from the optical axis (e.g., 80% of diffraction zones of larger distances from the optical axis, of all the diffraction zones satisfying the phase function expression) are non-uniform. For example, even if two diffraction zones adjacent to each other have an equal width, as an exception, "the widths of diffraction zones are non-uniform" as long as adjacent diffraction zones generally have different widths from each other.

Next, the Fraunhofer diffraction image occurring from each of the diffraction zones 271 is obtained (Step 1-(2)).

Next, the Fraunhofer diffraction images obtained are superposed together, thereby estimating the intensity of the fringe flare light 281 occurring from the entire surface of the diffraction grating 252 (Step 1-(3)). The phase function (the widths of diffraction zones) is finalized based on the fringe flare light 281 (Step 1-(4)).

In Step 1-(4), the intensity of the fringe flare light 281 estimated in Step 1-(3) may be compared with the reference intensity of the fringe flare light 281, and the phase function may be employed if the estimated intensity of the fringe flare light 281 is within the acceptable range. Alternatively, Step 1-(1) to Step 1-(3) may be repeated a plurality of times to estimate the intensity of the fringe flare light 281 a plurality of times so as to employ a phase function that gives the least fringe flare light 281. By optimizing the phase function in advance as described above, it is possible to easily reduce the fringe flare light, as compared with a case where the phase function and the aspherical coefficient are optimized simultaneously. It is also possible to prevent the widths of the diffraction zones from becoming narrow, making the machining process difficult.

Note that it is not necessary to obtain, through fitting, the phase function expression in Step 1-(4) as long as the widths of the diffraction zones 271 are determined by varying the widths of the diffraction zones 271 by varying the coefficient of the phase function in Step 1-(1).

Now, the role of the diffraction grating 252 is the chromatic aberration correction. Therefore, when determining the widths of the diffraction zones 271 (the coefficient of the phase function), it is necessary to grasp in advance the diffraction power with which it is possible to provide the achromatization required by the optical system, and to satisfy that to some degree in Step 1-(1). Note that the coefficient of the phase function, which determines the diffraction power, is the second-order coefficient, i.e., $a_2$ of Exp. 1, and the range of variation of the widths of the diffraction zones 271 may be determined so that this value will fall within the desirable value range.

After the phase function of the diffraction grating is determined, next, as Step 2, the aspherical coefficient of the diffraction surface is optimized while the value of the coefficient of the determined phase function is fixed. By the optimization of the aspherical coefficient, it is possible to correct aberrations that cannot be corrected by a fixed phase function. The aspherical surface to be optimized may include not only the aspherical surface of the diffraction surface but also other surfaces of the optical system. By fixing the phase function, the widths of the diffraction zones capable of reducing the fringe flare light 281, which have been determined in advance, are maintained, and therefore it is possible to reduce the fringe flare light 281, irrespective of the aspherical shape. In this process, since the range of the phase function is adjusted so that chromatic aberrations can be corrected to some degree in Step 1-(1), the effect of the chromatic aberration correction is basically maintained, but if it is insufficient, the process may repeat Step 1 and Step 2 in a loop, e.g., by returning to Step 1 and re-determining the phase function again.

Although the phase function method is used for determining the widths of the diffraction zones in Step 1-(1) in the above description, a high refractive index method may be used, and any other method may be used as long as it is a method capable of determining the widths of the diffraction zones 271.

Figure 4:
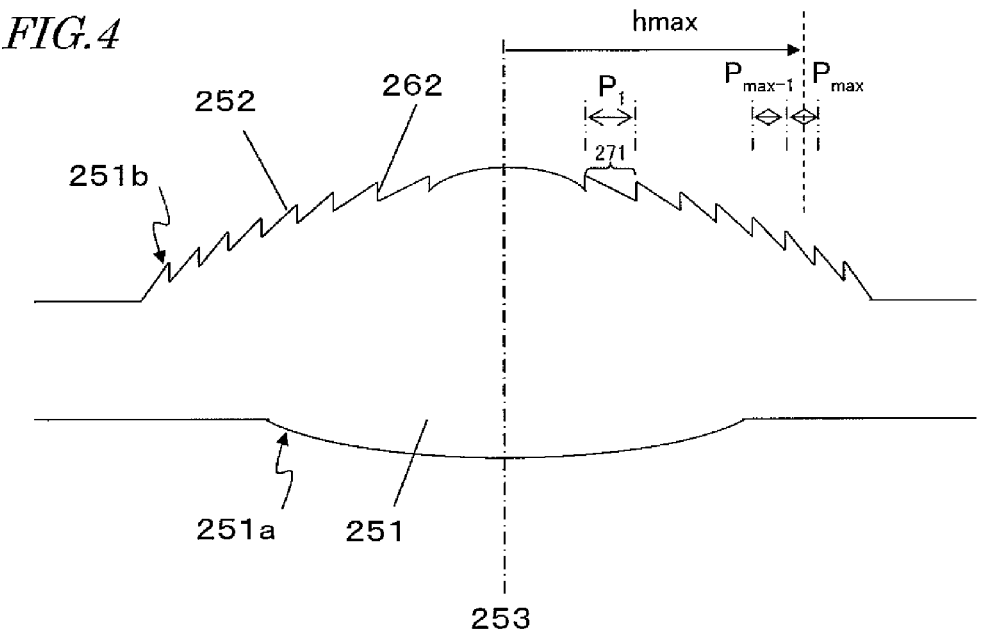
FIG. 4 A cross-sectional view showing a diffraction grating lens designed by the design method of Embodiment 1 of the present invention.

FIG. 4 is a cross-sectional view showing a diffraction grating lens designed by a design method of the present invention. The diffraction grating lens shown in FIG. 4 includes the lens base 251, and the diffraction grating 252 provided on the lens base 251. The lens base 251 has a first surface 251a and a second surface 251b, and the diffraction grating 252 is provided on the second surface 251b.

While the diffraction grating 252 is provided on the second surface 251b in the present embodiment, it may be provided on the first surface 251a. While FIG. 4 shows an embodiment where the step surfaces 262 are facing inward, the steps may face in the opposite direction, and the step surfaces 262 may be facing outward.

While the base shape of the first surface 251a and the second surface 251b is an aspherical shape in the present embodiment, the base shape may be a spherical or flat-plate shape. The base shape of the first surface 251a and that of the second surface 251b may be the same or different from each other. While each of the base shape of the first surface 251a and that of the second surface 251b is a convex aspherical shape, it may be a concave aspherical shape. Moreover, the base shape of one of the first surface 251a and the second surface 251b may be convex with the other being concave.

Figure 5:
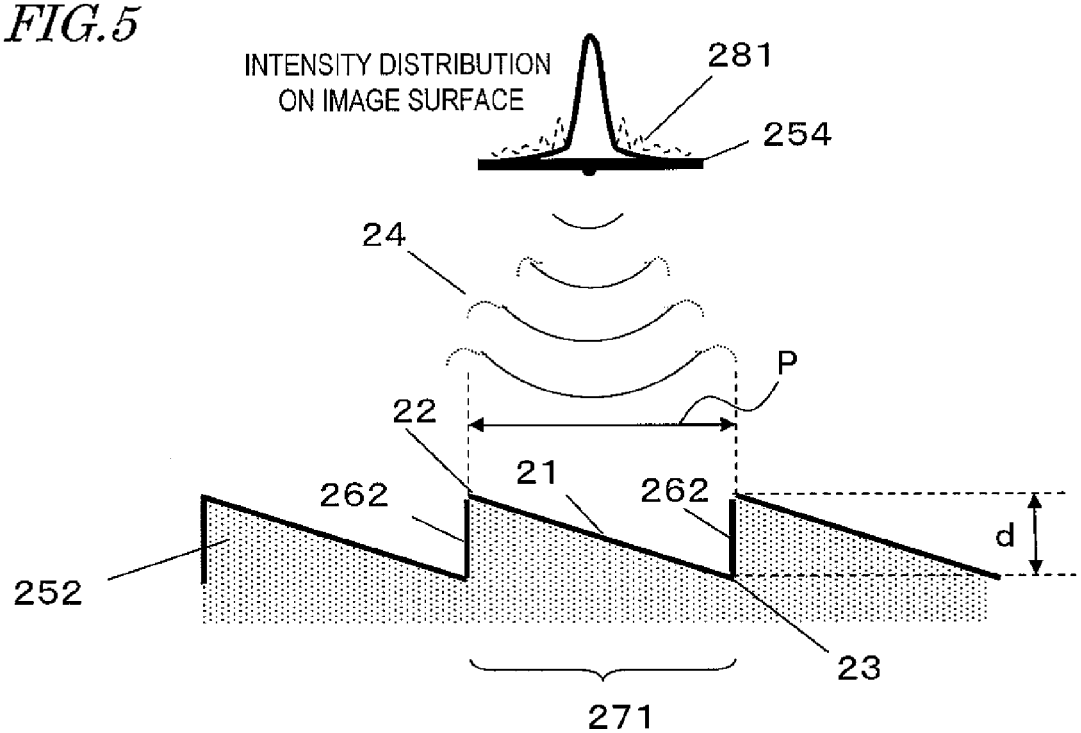
FIG. 5 A diagram showing, on an enlarged scale, portion of a diffraction grating lens designed by the design method of Embodiment 1.

FIG. 5 shows an enlarged view of a diffraction grating lens designed by the present embodiment. The diffraction grating 252 includes a plurality of diffraction zones 271 and a plurality of step surfaces 262, with one step surface 262 provided between adjacent diffraction zones 271. The diffraction zone 271 includes a slope surface 21 that is sloped in the width direction of the zone. The step surface 262 is connected to a tip portion 22 of an adjacent slope surface 21, and to a base portion 23 of the slope surface 21. The diffraction zone 271 is a ring-shaped portion sandwiched between step surfaces 262.

In the present embodiment, "the width P of the diffraction zone 271 (the pitch of the diffraction zone 271)" refers to the shortest distance between two step surfaces 262 interposing the diffraction zone 271 therebetween. Normally, the shortest distance between two step surfaces 262 is not the length along the slope surface 21 of the diffraction zone 271, but is the length along a plane vertical to the optical axis. As shown in FIG. 4, $P_1$ denotes the width of the first diffraction zone 271 counting from the optical axis side, $P_{max-1}$ the width of the second diffraction zone 271 counting inward from the position of the effective diameter $h_{max}$, and $P_{max}$ the width of the diffraction zone 271 located at the effective diameter $h_{max}$.

In the present embodiment, the diffraction zones 271 are arranged in a concentric pattern centered about an optical axis 253 (shown in FIG. 4) of the aspherical surface which is the base shape of the second surface 251b. Note that although the diffraction zones 271 do not always need to be arranged in a concentric pattern, it is preferred that the diffraction zones 271 are in rotational symmetry with respect to the optical axis 253 in order to achieve desirable aberration characteristics in an optical system for a photograph-taking application. The wave front divided by the step surface 262 passes through the slope surface 21, after which the spread-out 24 of the wave front occurs. This is the reason for the occurrence of the fringe flare light 281.

The height d of the step surface 262 satisfies Exp. 2 below. Here, $m_o$ is the design order ($m_o=1$ for first-order diffraction light), $\lambda$ is the working wavelength, and $n1(\lambda)$ is the refractive index of the lens base material.

$$d = \frac{m_0 \cdot \lambda}{n_1(\lambda) - 1} \qquad [\text{Exp. 2}]$$

Embodiment 2

In the present embodiment, the designing is done in Step 1 of Embodiment 1 so that the diffraction grating 252 has diffraction zones that satisfy Exp. 4 below. Specifically, in Step 1-(1) of FIG. 3, the widths of the diffraction zones can be determined so that there are diffraction zones that satisfy Exp. 4.

$$k = \left( \frac{1}{P_{m-1}} \cdot \frac{P_{m-1} - P_m}{P_{m-1} \cdot P_m} \right) \bigg/ \left( \frac{1}{P_1} \cdot \frac{P_1 - P_2}{P_1 \cdot P_2} \right) > 1.6 \qquad [\text{Exp. 4}]$$

where $P_1$ is the width of the first diffraction zone counting from the optical axis side, $P_2$ the width of the second diffraction zone, $P_m$ the width of the $m^{th}$ diffraction zone counting from the center of the diffraction surface, and $P_{m-1}$ the width of the $m-1^{th}$ diffraction zone on the diffraction surface.

The middle side of Exp. 4 represents the ratio between the amount of change (second-order derivative) in the gradient of the phase function for diffraction zones close to the center (the first and second zones counting from the optical axis side), and the amount of change (second-order derivative) in the gradient of the phase function for diffraction zones farther away from the center (the $m-1^{th}$ and $m^{th}$ zones counting from the optical axis side). The value of the middle side of Exp. 4 is larger as the amount of change in the gradient of the phase function for the $m-1^{th}$ and $m^{th}$ diffraction zones counting from the optical axis side is larger with respect to the amount of change in the gradient of the phase function for the first and second diffraction zones counting from the optical axis side.

In the design method of the present embodiment, the designing is done so that there are diffraction zones in the diffraction grating 252 such that the value of the middle side of Exp. 4 is greater than 1.6. With diffraction grating lenses by conventional design methods, there are no diffraction zones satisfying such a condition. This indicates that in the present embodiment, the amount of change in the gradient of the phase function for the m−$1^{th}$ and $m^{th}$ zones counting from the optical axis side is greater than those of conventional methods. In other words, it indicates that the widths of diffraction zones farther away from the center are non-uniform in the present embodiment, whereas the widths of diffraction zones farther away from the center are equal with conventional methods. This will later be discussed in detail.

As already described above with reference to FIG. 30, the width of a diffraction zone is shorter as the gradient of the phase function is larger. Generally, the width of a diffraction zone is set to be a certain width or more. An examination by the present inventor showed that with a conventional diffraction grating lens, the widths of diffraction zones farther away from the center were not made to decrease gradually away from the center, but rather, the widths of diffraction zones farther away from the center were equal. The fringe interval between diffraction fringes occurring as light passes through diffraction zones is greatly dependent on the zone widths, and the fringe intervals of diffraction fringes occurring as a result of passing through diffraction zones of the same zone width are substantially equal to one another. Therefore, as light passes through an area where the widths of the diffraction zones are equal, there occur diffraction fringes whose fringe intervals are substantially equal to one another, and they interfere with one another so as to emphasize one another, resulting in pronounced fringe flare. In the present embodiment, the widths of the diffraction zones farther away from the center can be decreased gradually away from the center. Thus, in the present embodiment, the widths of the diffraction zones farther away from the center can be set to be non-uniform, thereby suppressing the occurrence of fringe flare.

As a comparative example, the present inventor designed a diffraction grating lens capable of obtaining normal characteristics with no considerations to the reduction of fringe flare light. Exp. 4 will now be described in greater detail while comparing simulation results between diffraction grating lenses designed by a comparative example and the present embodiment.

Figure 6:
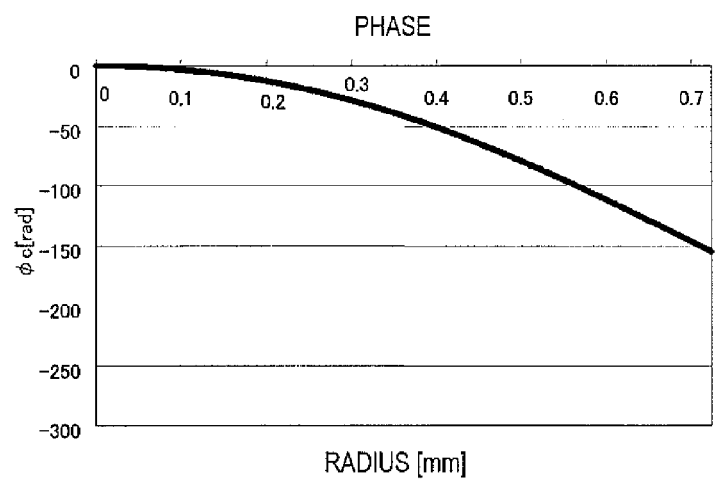
FIG. 6 (a) is a graph showing the phase function $\Phi c$ of a diffraction grating lens (comparative example) that is designed obtain normal characteristics, with no considerations to the reduction of fringe flare light. (b) is a graph showing the first-order derivative $\Phi c'$ of the phase function $\Phi c$ of the comparative example. (c) is a graph showing the second-order derivative $\Phi c''$ of the phase function $\Phi c$ of the comparative example.
Figure 6:
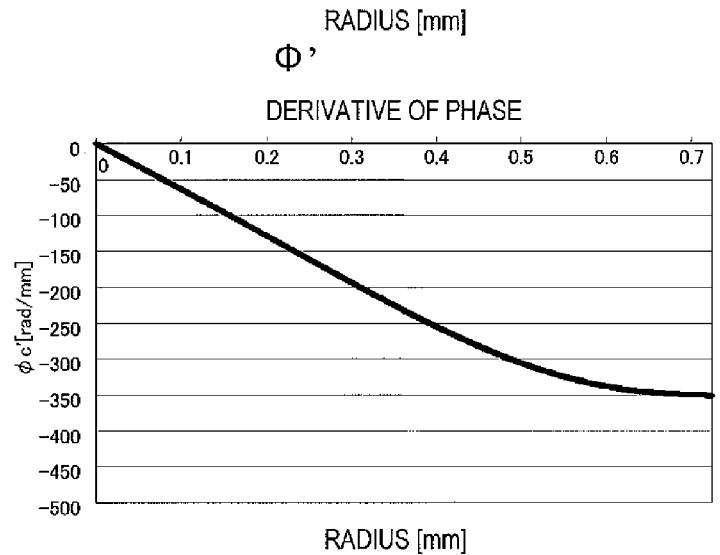
Figure 6:
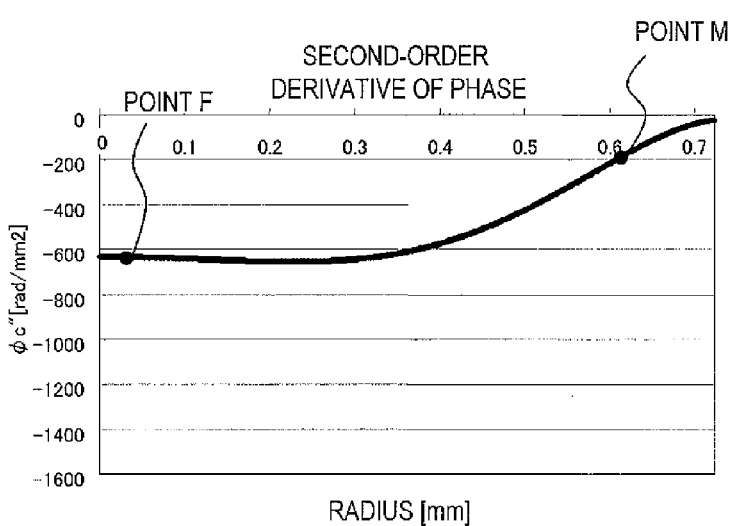
Figure 7:
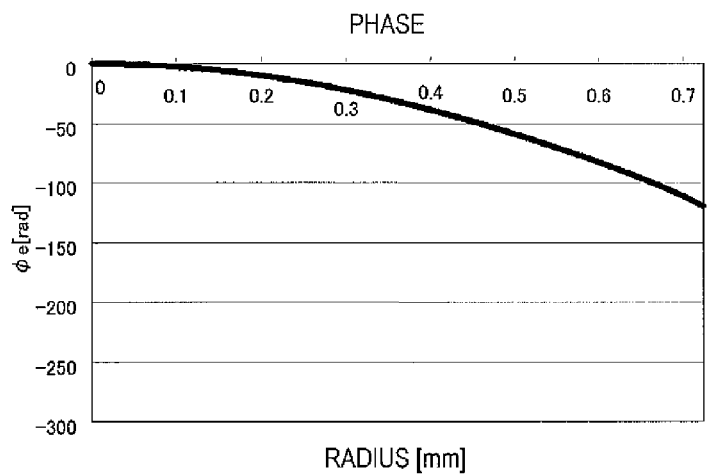
FIG. 7 (a) is a graph showing the phase function $\Phi e$ of a diffraction grating lens of Embodiment 1 designed with considerations to the reduction of fringe flare light. (b) is a graph showing the first-order derivative $\Phi e'$ of the phase function $\Phi e$ of Embodiment 1. (c) is a graph showing the second-order derivative $\Phi e''$ of the phase function $\Phi e$ of Embodiment 1.
Figure 7:
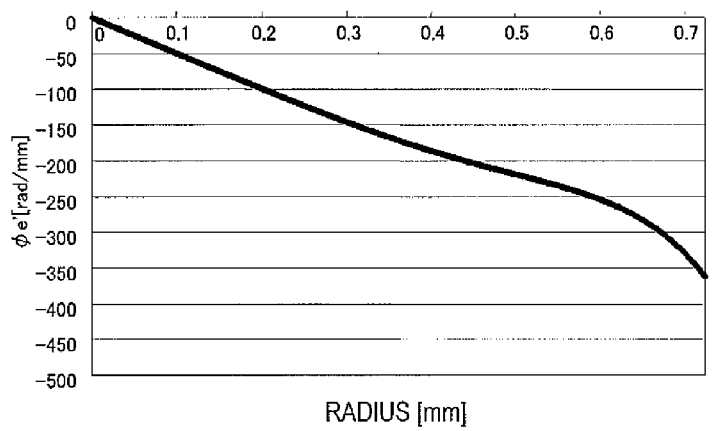
Figure 7:
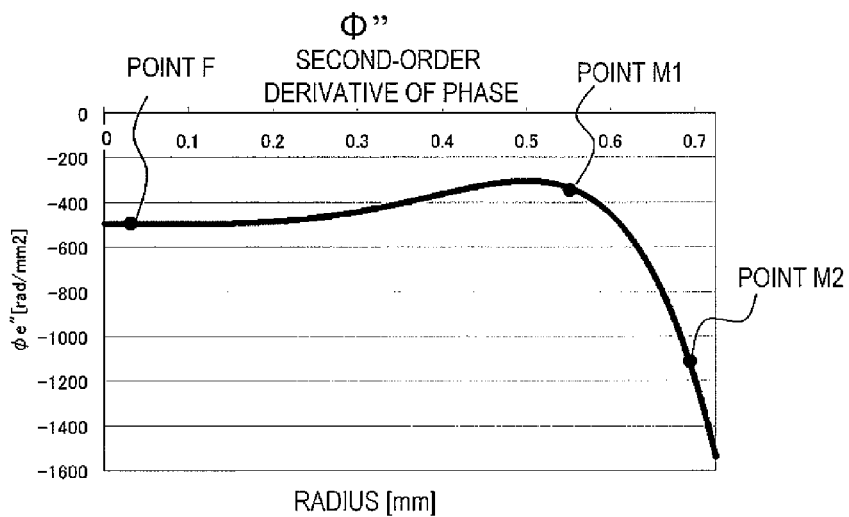

FIG. 6(a) is a graph showing the phase function Φc of a diffraction grating lens (comparative example) that is designed to obtain normal characteristics, with no considerations to the reduction of fringe flare light. On the other hand, FIG. 7(a) is a graph showing the phase function Φe of a diffraction grating lens designed by a method of the present embodiment with considerations to the reduction of fringe flare light. In the graphs of FIG. 6(a) and FIG. 7(a), the vertical axis represents the phase difference (rad), and the horizontal axis represents the distance from the center of the lens distance (the radius of the diffraction grating).

Comparing FIG. 6(a) and FIG. 7(a) with each other, the gradient of the phase function (absolute value) of FIG. 6(a) is greater than that of FIG. 7(a) for values of the horizontal axis from 0 to about 0.6. In FIG. 6(a), about when the value of the horizontal axis exceeds 0.6, the gradient of the phase function comes close to being constant. In contrast, in FIG. 7(a), about when the value of the horizontal axis exceeds 0.6, the gradient of the phase function increases.

FIG. 6(b) is a graph showing the first-order derivative Φc′ of the phase function Φc of the comparative example, and FIG. 6(c) is a graph showing the second-order derivative Φc″ of the phase function Φc of the comparative example. As can be seen from FIG. 6(b), in the comparative example, when the value of the horizontal axis is from 0 to about 0.6, the gradient (absolute value) of the phase function Φc increases along with the increase in the value of the horizontal axis. However, about when the value of the horizontal axis exceeds 0.6, the gradient of the phase function Φc comes close to being constant. From this graph, it is clear that the phase function Φc shown in FIG. 6(a) comes close to being a straight line about when the value of the horizontal axis exceeds 0.6.

Normally, when designing a diffraction grating lens, the width of the diffraction zone is set to be a certain width or more with considerations to the reduction of the decrease in transmittance due to beam loss in the diffraction step portion and to the machinability. As described above with reference to FIG. 30(b), since one diffraction zone is arranged each time the phase of the phase function is equal to 2π, the width of the diffraction zone is shorter as the gradient of the phase function is greater. Also in the comparative example, it is believed that since the width of the diffraction zone needs to be set to be a certain width or more, in diffraction zones of which the distance from the center is large, the increase in the gradient of the phase function is suppressed, whereby the phase function Φc comes close to being a straight line.

The rate of change (differential coefficient) of the value in the graph of FIG. 6(b) is shown in FIG. 6(c). Since the value of the vertical axis (the gradient of the phase function Φc) in the graph shown in FIG. 6(b) comes close to being constant about when the value of the horizontal axis exceeds 0.6, the value of the vertical axis in the graph shown in FIG. 6(c) comes close to being zero.

FIG. 7(b) is a graph showing the first-order derivative Φe′ of the phase function Φe of the present embodiment, and FIG. 7(c) is a graph showing the second-order derivative Φe″ of the phase function Φe of the present embodiment. The value of the vertical axis of FIG. 7(b) (the gradient of the phase function Φe of the present embodiment) is 0 when the value of the horizontal axis is 0, and gently decreases while the value of the horizontal axis is from 0 to 0.6. The rate of decrease of the value of the vertical axis increases about when the value of the horizontal axis exceeds 0.6. Thus, it can be seen that the absolute value of the gradient of the phase function Φe of the present embodiment shown in FIG. 7(a) increases about when the value of the horizontal axis exceeds 0.6.

About when the value of the horizontal axis exceeds 0.6, the value of the vertical axis (the gradient of the phase function Φe) in the graph shown in FIG. 7(b) decreases substantially, and therefore the value of the vertical axis (the rate of change in the graph shown in FIG. 7(b)) in the graph shown in FIG. 7(c) also moves away from 0.

Next, the process of deriving the middle side of Exp. 4 will be described.

It is assumed that a diffraction grating lens designed by the present embodiment includes q diffraction zones 271 that satisfy the phase function expression. Where $d_x$ denotes the height of the $x^{th}$ (x=1, 2, . . . , q) step surface 262 counting from the center of the diffraction grating lens, and $P_x$ the width of the $x^{th}$ diffraction zone 271 counting from the center of the diffraction grating lens, the gradients (the value of FIG. 7(b)) (Φe′ of the phase function Φe for the $1^{st}$, $2^{nd}$, . . . , m diffraction zones 271 counting from the center of the diffraction grating lens can be approximated to Φe(1)′=2π/$P_1$, Φe(2)′=2π/$P_2$, . . . , Φe(m)′=2π/$P_m$, respectively. Here, m is an integer greater than 3.

On the other hand, the rates of change (the values of FIG. 7(c)) Φe" of the gradient of the phase function Φe are expressed by Exp. 5, Exp. 6, and Exp. 7.

$$\phi_e(1)'' \approx \frac{\phi_e(2)' - \phi_e(1)'}{P_1} = 2\pi\left(\frac{1}{P_1} \times \frac{P_1 - P_2}{P_1 \cdot P_2}\right) \quad [\text{Exp. 5}]$$

$$\phi_e(2)'' \approx \frac{\phi_e(3)' - \phi_e(2)'}{P_2} = 2\pi\left(\frac{1}{P_2} \times \frac{P_2 - P_3}{P_2 \cdot P_3}\right) \quad [\text{Exp. 6}]$$

$$\phi_e(m)'' \approx \frac{\phi_e(m+1)' - \phi_e(m)'}{P_m} = 2\pi\left(\frac{1}{P_m} \times \frac{P_m - P_{m+1}}{P_m \cdot P_{m+1}}\right) \quad [\text{Exp. 7}]$$

k is defined as shown in Exp. 8 below. In Exp. 8, 3<m≤q.

$$k = \Phi_e(m)''/\Phi_e(1)'' \quad [\text{Exp. 8}]$$

Substituting the values of Exp. 5 and Exp. 7 into Exp. 8, the middle side of Exp. 4 is obtained.

Exp. 5, Exp. 6 and Exp. 7 are values on the graph of FIG. 7(c). Point F is plotted on the graph of FIG. 7(c) as a value corresponding to Φe(1)" of Exp. 8. In the expression of Exp. 8, since m is a value that satisfies 3<m≤q, the point corresponding to Φe(m)" can be plotted at any position (except for Φe(1)" and Φe(2)") on the graph shown in FIG. 7(c). Here, Point M1 and Point M2 are plotted on the graph of FIG. 7(c) each as examples of values corresponding to Φe(m)". Point F is about −500, Point M1 about −360, and Point M2 about −1100. Substituting the value of Point M1 into Exp. 8, the value of k is 0.7, and substituting the value of into Exp. 8, the value of k is 2.2. From these results, it can be seen that in the present embodiment, the value of k exceeds 1.6 by choosing the value of m of Φe(m)".

Exp. 8 shows the relationship of the second-order derivative Φe" of the present embodiment. The relationship of the second-order derivative Φc" of the comparative example is as shown in Exp. 9 below.

$$k_c = \Phi_c(m)''/\Phi_c(1)'' \quad [\text{Exp. 9}]$$

Point F is plotted on the graph of FIG. 6(c) as a value corresponding to Φc(1)" of Exp. 9. Point M is plotted on the graph of FIG. 6(c) as an example of a value corresponding to Φc(m)". Point F is about −630, and Point M about −200. Substituting these values into Exp. 9, the value of kc is 0.3. Point M is any point (except for Φc(1)" and Φc(2)") on the graph shown in FIG. 6(c). Since the minimum value of the value of the graph shown in FIG. 6(c) is about −650, the maximum value of the value of kc is about 1 no matter where Point M is located.

As described above, with the design of the present embodiment, the value of k may take a value greater than kc of the comparative example.

Note that FIG. 6(a) to (c) and FIGS. 7(a) to (c) show phase functions for the first diffraction zone counting from the optical axis side to the farthest diffraction zone from the optical axis that satisfies the phase function expression. When a diffraction grating lens designed by the present embodiment is used in an image pickup optical system, the effective diameter ($h_{max}$) is determined by the stop and the field angle. Diffraction zones that satisfy the phase function expression may be provided from the position of the optical axis to the position of the effective diameter on the lens surface, or may be provided to a position outside the effective diameter. Outside the effective diameter, diffraction gratings that do not satisfy the phase function expression may be provided.

Next, the process of deriving the threshold value of Exp. 4 (the value of the right-hand side) will be described.

As shown in FIG. 2(a), the fringe flare light 281 occurring from the diffraction zone 271 is a flare having a bright/dark pattern of intensity. The fringe interval of the fringe flare light 281 occurring from the diffraction zone 271 is in inverse relation to the width of the diffraction zone 271. The fringe interval of the fringe flare light 281 is narrowed as the width of the diffraction zone 271 is increased, whereas the fringe interval of the fringe flare light 281 is widened as the width of the diffraction zone 271 is decreased. An image on the image surface formed by a diffraction grating lens having a plurality of diffraction zones 271 is the result of superposing together the fringe flare light 281 occurring from the diffraction zones 271 as shown in FIG. 2(b). Therefore, by controlling the widths of the diffraction zones, the flare light 281 occurring from the diffraction zones 271 can be allowed to interfere with one another, thereby reducing the change in intensity (bright/dark pattern) of the fringe flare light 281.

Figure 8:
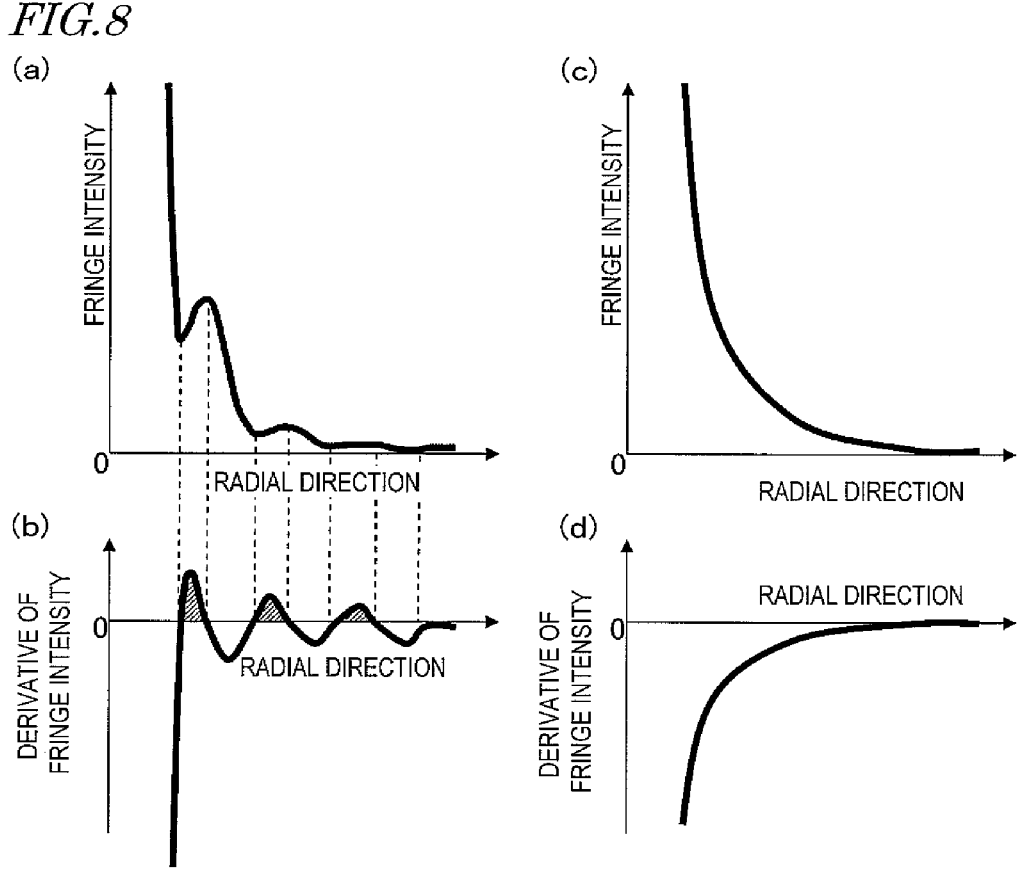
FIG. 8 (a) to (d) are graphs illustrating a method for calculating the degree of fringe definition.

First, in order to obtain the threshold value of Exp. 4, the degree of fringe definition of the fringe flare light 281 is defined. FIG. 8(a) is a cross-sectional intensity distribution of a spot formed on the image-capturing surface through the diffraction grating lens. If the fringe flare light 281 is present, the intensity distribution will be wavy as shown in FIG. 8(a). FIG. 8(b) shows the derivative thereof. Points where the fringe gradient is positive in FIG. 8(a) each appear as a positive value in FIG. 8(b). The derivative of the fringe intensity of FIG. 8(b) changes more greatly as the waviness of FIG. 8(a) is greater, i.e., as the degree of definition of the fringe bright/dark pattern is larger. Conversely, if the fringe has no waviness as shown in FIG. 8(c), there will be no positive values in the derivative of the fringe intensity as shown in FIG. 8(d). Therefore, the degree of fringe definition may be defined as what is obtained by integrating positive values of the derivative of the fringe intensity, and a smaller value of the degree of fringe definition represents less waviness of the fringe intensity. Specifically, the integrated value of the area of the hatched portions of FIG. 8(b) is the degree of fringe definition. Now, it may appear to be a good idea to also integrate negative values in addition to positive values because a greater absolute value of a negative value of the derivative represents greater waviness of the fringe. However, it will not be distinguishable from the foot area near the center of the spot since the value is also negative therein. Therefore, it is desirable to integrate only positive values for the degree of fringe definition. Note that in the calculation of the degree of fringe definition, in order to reduce errors due to high-frequency components, a moving average operation was performed before and after the differentiation to improve the calculation precision.

Figure 9:
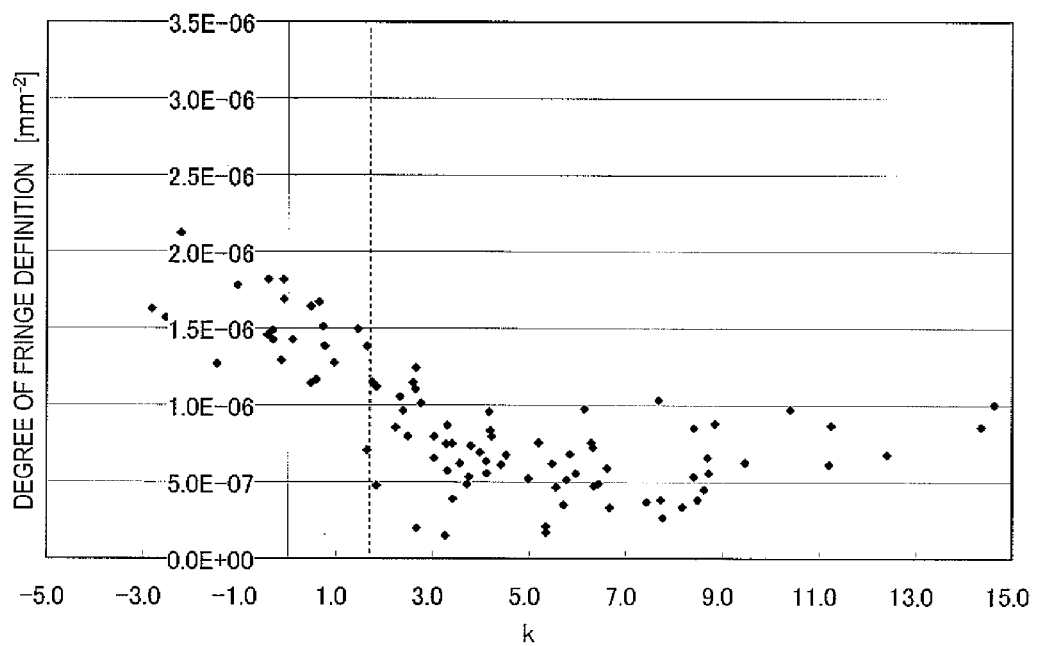
FIG. 9 A graph showing the relationship between the value k in a conditional expression and the degree of fringe definition.

FIG. 9 is a plot of the results of the degree of fringe definition for data of a diffraction grating lens having various diffraction zone widths, where the left-hand side k of Exp. 4 is represented along the horizontal axis, and the degree of fringe definition of the fringe flare light 281 along the vertical axis. The smaller the degree of fringe definition, the better it is with a reduced change through the fringe bright/dark pattern. It can be seen from FIG. 9 that the degree of fringe definition can be made small stably by setting the value of k to be 1.6 or more. It was analytically confirmed that if the degree of fringe definition is $10^{-6}$ (1.0e−6) mm$^{-2}$ or less, a good image is obtained with the fringe flare light 281 being inconspicuous when taking a photograph of a light source of a brightness level of a fluorescent lamp in a room. The degree of fringe definition can be generally kept to be $10^{-6}$ mm$^{-2}$ or less by setting the value of k to be 1.6 or less.

Where d denotes the height of the diffraction step, the widths P of the diffraction zones 271 may be configured so that all the diffraction zones 271 within the effective diameter satisfy Exp. 10 below.

$$P > d \qquad [\text{Exp. 10}]$$

If Exp. 10 is not satisfied, the width of the diffraction zone 271 is smaller than the step height, and the aspect ratio of the step height with respect to the width of the diffraction zone 271 becomes greater than 1, thereby making the machining process difficult.

There may be a plurality of surfaces to which the diffraction grating 252 is added. In such a case, there is an advantage that the fringe flare light 281 from different surfaces can be allowed to interfere with one another, thereby reducing the fringe. However, if the diffraction grating 252 is present on a plurality of surfaces, the diffraction efficiency decreases on each surface, and a substantial amount of the unnecessary-order diffraction light 256 will occur in the optical system as a whole. Thus, in view of ensuring the first-order diffraction efficiency, it is desirable that there is a single surface to which the diffraction grating 252 is added. Note however that in a case where a plurality of surfaces of which the periods of the diffraction gratings coincide with one another are arranged with a minute gap therebetween (e.g., Embodiment 4), the decrease in the diffraction efficiency is about the same as that when the diffraction grating is provided only on one surface.

Exp. 4 can be rewritten as shown in Exp. 11 below. If it is rewritten as shown in Exp. 11, in the present embodiment, it is only needed that there is at least one pair of m and n that satisfy Exp. 11.

$$k = \left( \frac{1}{P_{m-1}} \cdot \frac{P_{m-1} - P_m}{P_{m-1} \cdot P_m} \right) / \left( \frac{1}{P_{n-1}} \cdot \frac{P_{n-1} - P_n}{P_{n-1} \cdot P_n} \right) > 1.6 \qquad [\text{Exp. 11}]$$

Note however that $P_n$ is the width of the $n^{th}$ diffraction zone counting from the optical axis side, $P_{n-1}$ is the width of the $n-1^{th}$ diffraction zone, $P_m$ is the width of the $m^{th}$ diffraction zone from the center on the diffraction surface, and $P_{m-1}$ is the width of the $m-1^{th}$ diffraction zone from the center on the diffraction surface. n is an integer less than m.

Embodiment 3

The design method of the present invention is applicable also to a diffraction grating lens with an optical adjustment film provided on the surface thereof. Such an embodiment will now be described.

Figure 10:
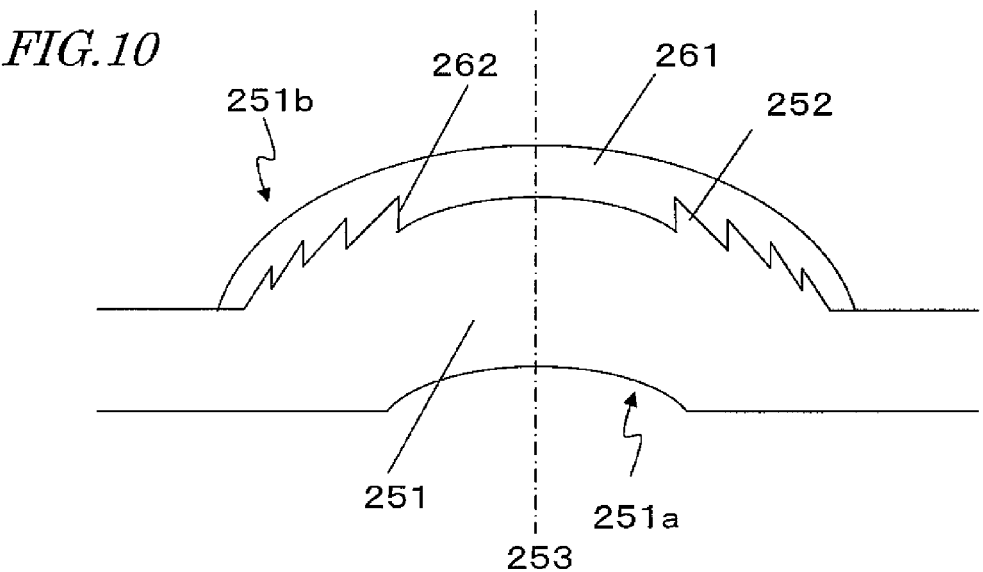
FIG. 10 A cross-sectional view schematically showing a diffraction grating lens that is designed by a method of Embodiment 3.

FIG. 10 is a cross-sectional view schematically showing a diffraction grating lens designed by a method of Embodiment 3. The diffraction grating lens shown in FIG. 10 further includes the optical adjustment film 261 provided on the second surface 251b of the diffraction grating 252. In FIG. 10, like components to those of FIG. 4 will not be described below.

The material of the optical adjustment film 261 may be a resin, a glass, or the like, or may be a composite material between a resin and inorganic particles, or the like.

The height d of the step surface 262 of the present embodiment satisfies Exp. 12 below. Here, $m_o$ is the design order ($m_o=1$ for first-order diffraction light), λ the design wavelength, $n_1(\lambda)$ the refractive index of the lens base material at λ, and $n_2(\lambda)$ the refractive index of the optical adjustment film material at λ. If this expression is satisfied, it is possible to reduce the flare due to the unnecessary-order diffraction light 256 across the entire visible light range.

$$\frac{0.9 \, m_o \lambda}{|n_1(\lambda) - n_2(\lambda)|} \leq d \leq \frac{1.1 \, m_o \lambda}{|n_1(\lambda) - n_2(\lambda)|} \qquad [\text{Exp. 12}]$$

Figure 11:
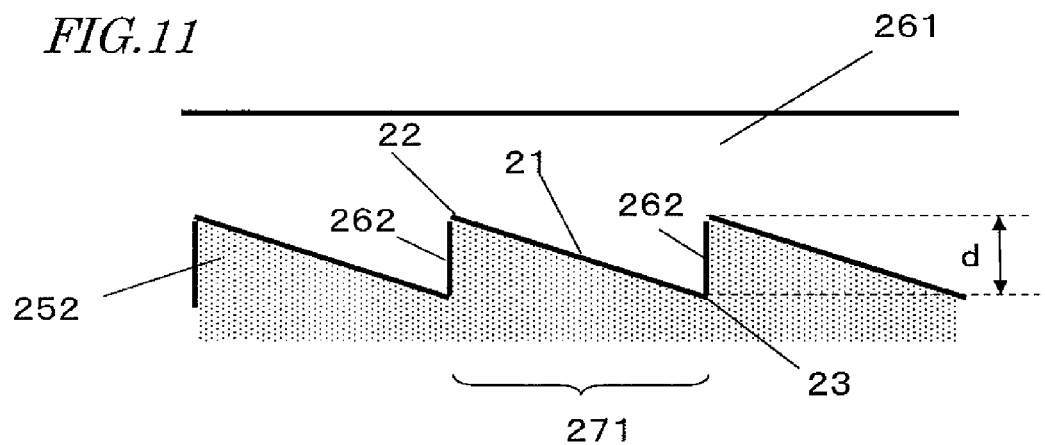
FIG. 11 An enlarged view of the diffraction grating lens of Embodiment 3.

FIG. 11 shows an enlarged view of a diffraction grating lens of the present embodiment. The diffraction grating 252 includes a plurality of diffraction zones 271 and a plurality of step surfaces 262, with one step surface 262 provided between adjacent diffraction zones 271. The diffraction zone 271 includes the slope surface 21 that is sloped in the width direction of the diffraction zone 271. The step surface 262 connects together the tip portion 22 of an adjacent slope surface 21 and the base portion 23 of the slope surface 21. The diffraction zone 271 is a ring-shaped protruding portion sandwiched between the step surfaces 262. In the present embodiment, the diffraction zones 271 are arranged in a concentric pattern centered about the optical axis 253 of the aspherical surface which is the base shape of the first surface 251a and the base shape of the second surface 251b. Note that the diffraction zones 271 do not always need to be arranged in a concentric pattern. However, in order to realize desirable aberration characteristics in an optical system for a photograph-taking application, it is preferred that the zone shape of the diffraction zones 271 is in rotational symmetry about the optical axis 253.

In the present embodiment, after the optical system is designed through steps similar to those of Embodiment 2, conditions (thickness, material, etc.) of the optical adjustment film satisfying the condition of Exp. 12 may be set. According to the present embodiment, advantageous effects similar to those of Embodiment 2 can be obtained. That is, as the diffraction grating 252 includes diffraction zones satisfying Exp. 4, it is possible to suppress the occurrence of fringe flare light. Moreover, according to the design method of the present embodiment, with the provision of the optical adjustment film 261, it is possible to also reduce the flare due to the unnecessary-order diffraction light 256 across the entire visible light range.

Embodiment 4

The design method of the present invention is also applicable to an optical element including two or more lenses provided with a diffraction grating. Such an embodiment will now be described.

Figure 12:
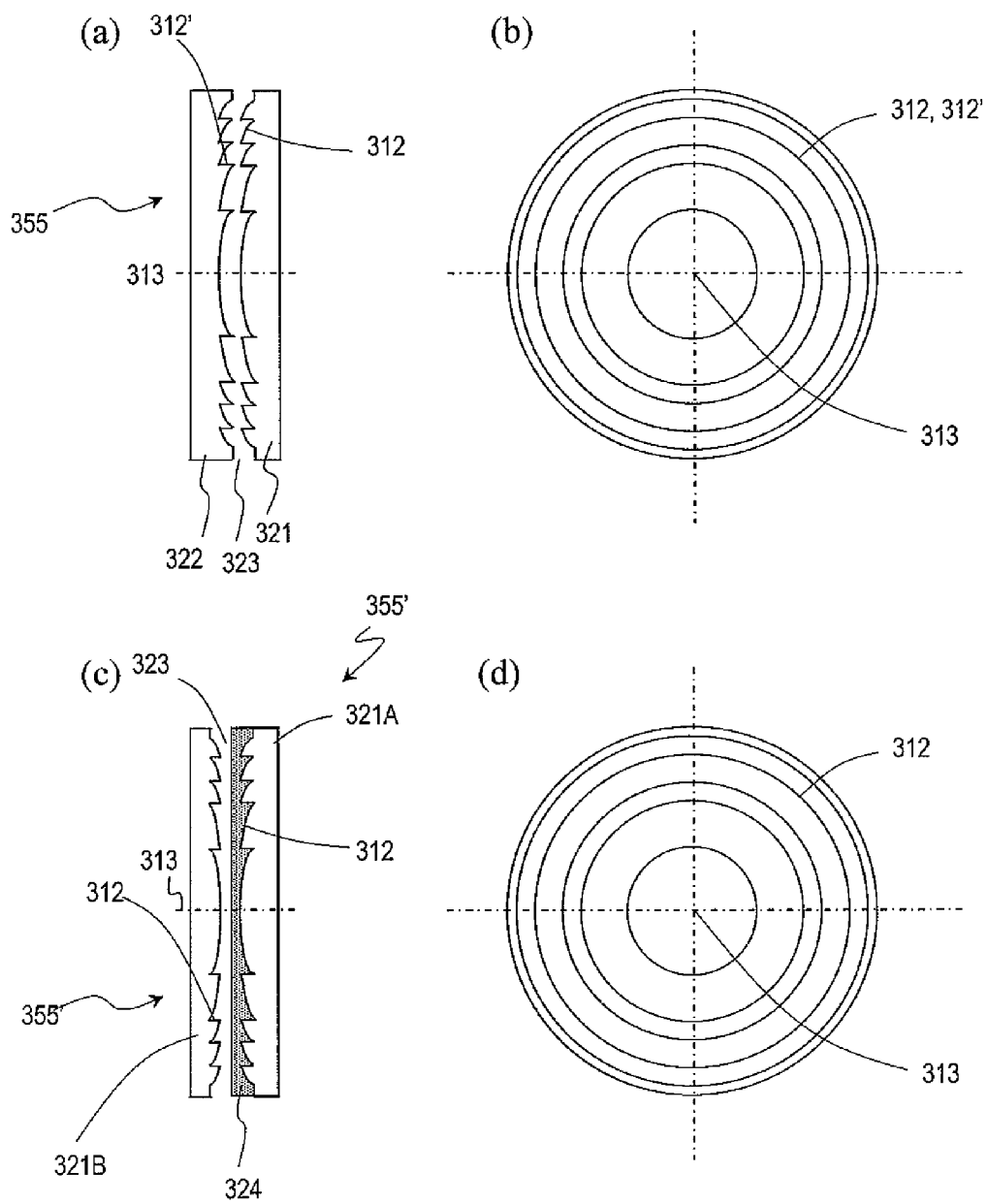
FIG. 12 (a) is a cross-sectional view schematically showing an optical element designed by a method of Embodiment 4, and (b) is a plan view thereof. (c) is a cross-sectional view schematically showing a variation of an optical element obtained by the design method of Embodiment 4, and (d) is a plan view thereof.

FIG. 12(a) is a cross-sectional view schematically showing an optical element designed by the method of Embodiment 4, and FIG. 12(b) is a plan view thereof. An optical element 355 includes two lenses provided with a diffraction grating. One of the lenses includes a base 321, and a diffraction grating 312 provided on one of the two surfaces of the base 321. The other lens includes a base 322, and a diffraction grating 312' provided on one of the two surfaces of the base 322. The two lenses are held with a predetermined gap 323 therebetween. The diffraction grating 312 and the diffraction grating 312' are formed in a concentric pattern centered about a point 313, at which the optical axis and the lens intersect with each other. The diffraction grating 312 and the diffraction grating 312' differ from each other in terms of the sign (positive and negative) of the diffraction order to be used, but use the same phase difference function.

FIG. 12(c) is a cross-sectional view schematically showing a variation of an optical element obtained by the design method of the present embodiment, and FIG. 12(d) is a plan view thereof. An optical element 355' includes two lenses and an optical adjustment layer 324. One of the lenses includes a base 321A, and a diffraction grating 312 provided on one of the two surfaces of the base 321A. The other lens includes a base 321B, and a diffraction grating 312 provided on one of the two surfaces of the base 321B. The optical adjustment layer 324 covers the diffraction grating 312 of the base 321A. The two lenses are held so that the gap 323 is formed between the diffraction grating 312 provided on the surface of the base 321B and the optical adjustment layer 324. The diffraction gratings 312 of the two lenses have the same shape.

Also in the present embodiment, an optical element can be designed through steps similar to those of Embodiment 2, and advantageous effects similar to those of Embodiment 2 can be obtained. That is, as the diffraction gratings 312 and 312' each have diffraction zones that satisfy Exp. 4, it is possible to suppress the occurrence of fringe flare light.

In the optical elements 355 and 355', a pair of lenses each provided with either the diffraction grating 312 or the diffraction grating 312' are arranged close to each other, and the shapes of the two diffraction gratings 312 and 312' are the same or corresponding to each other. Therefore, the two diffraction gratings 312 and 312' function substantially as a single diffraction grating, and the advantageous effects described above can be obtained without causing a significant decrease in the diffraction efficiency.

A simple-type diffraction grating of Embodiment 2 with no optical adjustment layer on the surface thereof, an adhesion-type diffraction grating of Embodiment with an optical adjustment layer on the surface thereof, and a stack-type diffraction grating of Embodiment 4 all have the same distribution of fringe flare light if the diffraction zones of the diffraction gratings have the same widths. That is, the degree of fringe definition will be the same value if the diffraction zones of the diffraction gratings have the same widths. This is because fringe flare light as used in the present specification occurs due to the Fraunhofer diffraction phenomenon where the diffraction zones serve as very narrow slits, and is not dependent on the type of the medium with which the diffraction grating is in contact. Therefore, with any of the simple-type diffraction grating of Embodiment 2, the adhesion-type diffraction grating of Embodiment 3, and the stack-type diffraction grating of Embodiment 4, it is possible to suppress the occurrence of fringe flare light if the zones of the diffraction grating satisfy Exp. 4.

Embodiment 5

A method for designing an image pickup optical system by the present invention will now be described. In the present embodiment, the design methods of Embodiments 1 to 3 are used.

In the present embodiment, as in Embodiment 1, after Step 1 and Step 2 shown in FIG. 1 are performed, conditions (thickness, material, etc.) of the optical adjustment film satisfying the condition of Exp. 12 may be set.

In an image pickup optical system, the effective diameter of the diffraction grating lens is determined by the field angle and the position and the diameter of the stop. With the design method of the present embodiment, the designing is done in Step 1 so that those of a plurality of diffraction zones that are located within the effective diameter satisfy the phase function φ of Exp. 1.

As in Embodiment 1, in order to effectively suppress fringe flare light, it is preferred that the widths of the plurality of diffraction zones are set to be non-uniform in Step 1. In this case, steps shown in FIG. 3 can be performed as a specific example of Step 1.

In Step 1 of the present embodiment, the designing is done so that the diffraction grating 252 satisfies Exp. 13 below.

$$k = \left(\frac{1}{P_{max-1}} \cdot \frac{P_{max-1} - P_{max}}{P_{max-1} \cdot P_{max}}\right) / \left(\frac{1}{P_1} \cdot \frac{P_1 - P_2}{P_1 \cdot P_2}\right) > 1.6 \quad \text{[Exp. 13]}$$

Note however that $P_{max}$ is the width of the diffraction zone at the position of the effective diameter $h_{max}$ on the diffraction surface, and $P_{max-1}$ the width of the second diffraction zone counting from the position of the effective diameter $h_{max}$ on the diffraction surface. Note that as shown in FIG. 4, a diffraction lens may include some diffraction zones provided at positions outside the effective diameter $h_{max}$.

Other than what has been pointed out, the present embodiment is similar to Embodiment 2, and will not be further described below.

Figure 13:
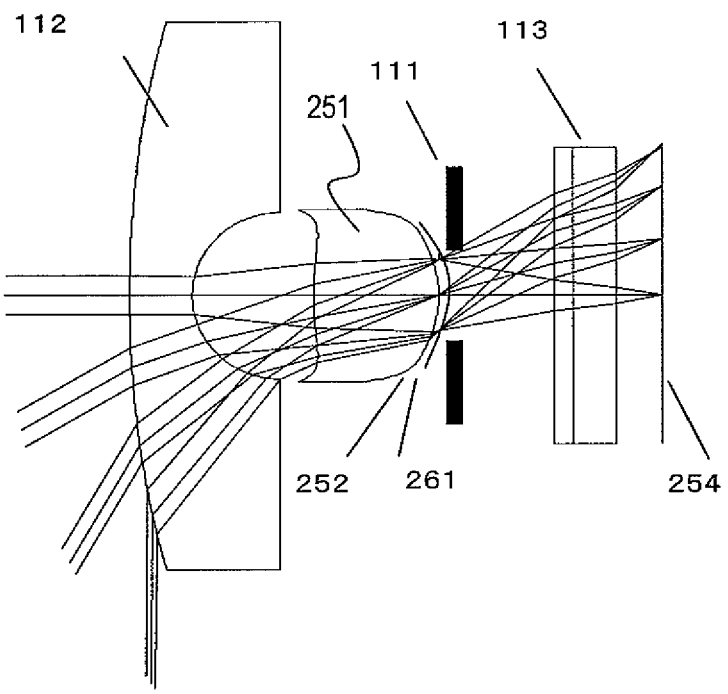
FIG. 13 A cross-sectional view schematically showing an image pickup optical system obtained by a design method of the present invention.

FIG. 13 is a cross-sectional view schematically showing an image pickup optical system obtained by the design method of the present invention. As shown in FIG. 13, the image pickup optical system obtained by the present embodiment includes a meniscus concave lens 112, a diffraction grating lens (lens base) 251, a stop 111, a cover glass and a filter 113, and an image pickup element 254. The stop 111 is arranged on the side of the diffraction surface of the diffraction grating lens 251.

The optical adjustment film 261 satisfying Exp. 12 is provided on the surface (the second surface 251b in FIG. 10) of the diffraction grating lens 251.

Light entering the image pickup optical system obtained by the present embodiment is first collected by the meniscus concave lens 112 to enter the diffraction grating lens 251. Light which has entered the diffraction grating lens 251 passes through the diffraction grating lens 251 and then enters the stop 111. Light which has passed through the stop 111 passes through the cover glass and the filter 113 and then reaches the image pickup element 254.

In the present embodiment, the meniscus concave lens 112 is used as an optical lens other than the diffraction grating lens, but another lens such as a spherical lens or an aspherical lens may be used, and a spherical and an aspherical may be used both. The number of lenses is also not limited to one, but a plurality of lenses may be used.

It is desirable that the surface to which the diffraction grating 252 is added is the closest surface to the stop 113. With such a configuration, the effective area on the diffraction surface will be substantially the same at any field angle, and it is therefore possible to reduce the field angle dependency of the flare-reducing effect. As the stop 113 moves away from the diffraction surface, the lengths of the arcs of the zones within the effective area become non-uniform as shown in FIG. 35, and the lengths of the arcs of the occurring fringes also become non-uniform, whereby the fringe flare light 281 is likely to remain and difficult to eliminate. However, as the diffraction surface is arranged in the vicinity of the stop, zones within the effective area will all be donut-shaped, and each zone will have its entire circumference arranged within the effective area. In such a case, the occurring fringes also will all be donut-shaped, and it is therefore possible to effectively reduce the fringe flare light 281 by a combination thereof.

In the image pickup optical system of Embodiment 5, it is preferred that the axial chromatic aberration is corrected slightly insufficiently. Specifically, the back focus for C—line may be set to be longer than the back focus for g-line. This is because if one attempts to satisfy Exp. 4 while completely correcting the axial chromatic aberration, the widths of diffraction zones in the vicinity of the effective diameter are likely to be narrow, thereby deteriorating the machinability. In order to satisfy Exp. 4 so that the widths of the diffraction zones will not be narrow, it is preferred that the widths of the diffraction zones are slightly increased across the entire effective area, i.e., the diffraction power is slightly lowered. By slightly lowering the diffraction power, the axial chromatic aberration will be corrected slightly insufficiently.

It is more effective to use the configurations of Embodiments 1 to 5 in ultra-wide-angle optical systems. This is because as the field angle is higher, the angle (the gradient from the optical axis) of the beam entering the diffraction grating 252 is larger, thereby increasing the proportion of the amount of light entering the step surface 262 with respect to the amount of light entering the zone slope surface 21. Therefore, in an ultra-wide-angle optical system, as compared with a normal optical system, the width of the beam passing through the zone slope surface 21 is narrower, thereby relatively increasing the amount of light of the fringe flare light 281 with respect to the amount of main spot light, thus making the fringe flare light 281 more problematic.

While an image pickup optical system including a diffraction grating lens having the optical adjustment film 261 is designed in the present embodiment, an image pickup optical system including a diffraction grating lens (Embodiment 2) which does not have the optical adjustment film 261 may be designed, or an image pickup optical system including an optical element (Embodiment 4) having a plurality of diffraction gratings may be designed.

Using design methods of Embodiments 1 to 5, a diffraction grating lens and an image pickup optical system having a diffraction grating lens can be manufactured. A diffraction grating lens can be produced for example by molding a material such as a resin using a mold having irregularities of the diffraction grating shape. An image pickup optical system can be manufactured by a known method using the diffraction grating lens described above.

Example 1

Figure 14:
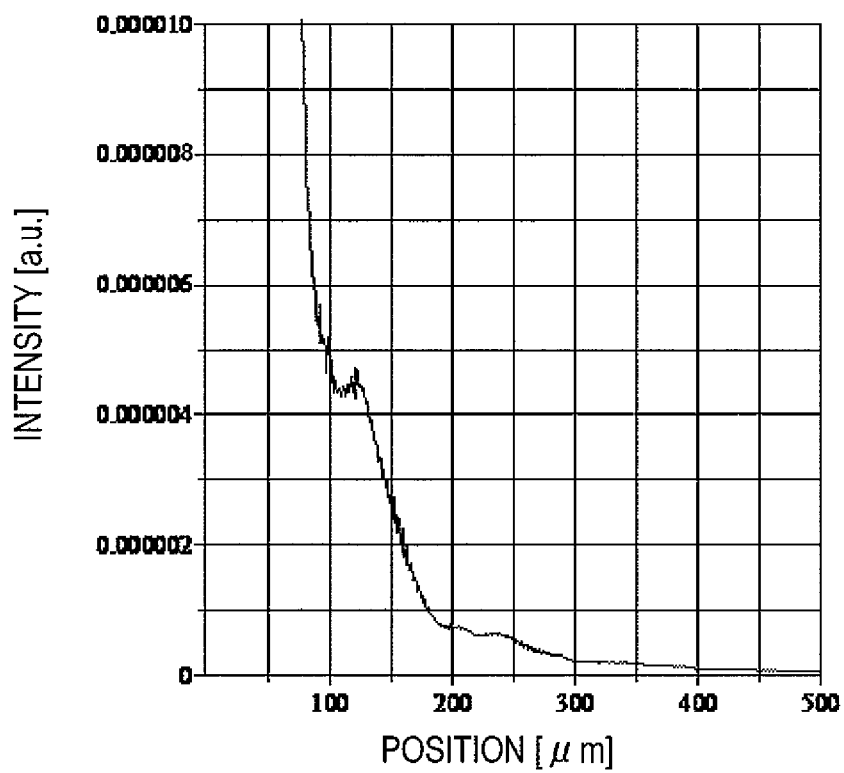
FIG. 14 A diagram showing a cross-sectional intensity distribution of fringe flare light of a diffraction grating lens according to Example 1.

As Example 1, a diffraction grating lens obtained by the design method of the present invention was analyzed. First, as Step 1-(1), the widths (pitches) of the diffraction zones within the effective diameter were determined as shown in Table 1. Next, Fraunhofer diffraction images occurring from the determined diffraction zone widths were calculated, and superposed together, thus calculating the fringe flare light 281 (Step 1-(2), (3)). FIG. 14 shows a cross-sectional intensity distribution of the fringe flare light 281 obtained. Table 2 shows the optical path difference function ($\psi(r)$ of Exp. 1) of the diffraction grating of Table 1. The phase function $\phi(r)$ and the optical path difference function $\psi(r)$ are in such a relationship as shown in Exp. 1. In the present example, the designing was done by using only even-number-order coefficients. Specifications of the diffraction grating are shown below.

Fno: 2.8
Value of k of conditional expression: 2.4
Degree of fringe definition: $9.7 \times 10^{-7}$ (9.7e−7)

TABLE 1

| Zone number | Zone position [mm] | Pitch [mm] |
| --- | --- | --- |
| 1 | 0.180 | 0.180 |
| 2 | 0.250 | 0.071 |

TABLE 1-continued

| Zone number | Zone position [mm] | Pitch [mm] |
| --- | --- | --- |
| 3 | 0.303 | 0.053 |
| 4 | 0.347 | 0.043 |
| 5 | 0.384 | 0.038 |
| 6 | 0.418 | 0.034 |
| 7 | 0.449 | 0.031 |
| 8 | 0.477 | 0.029 |
| 9 | 0.504 | 0.027 |
| 10 | 0.530 | 0.025 |
| 11 | 0.554 | 0.024 |
| 12 | 0.577 | 0.023 |
| 13 | 0.600 | 0.022 |
| 14 | 0.621 | 0.022 |
| 15 | 0.642 | 0.021 |
| 16 | 0.662 | 0.020 |
| 17 | 0.682 | 0.020 |
| 18 | 0.701 | 0.019 |
| 19 | 0.719 | 0.018 |
| 20 | 0.736 | 0.018 |

TABLE 2

| | |
| --- | --- |
| Diffraction order | 1 |
| Normalized wavelength | 538 |
| R**2 (a2) | −0.01604 |
| R**4 (a4) | −0.02 |
| R**6 (a6) | 0.04 |
| R**8 (a8) | −0.03 |
| R**10 (a10) | 0.000806 |
| R**12 (a12) | 0 |
| R**14 (a14) | 0 |

Example 1 satisfies Exp. 4, and it can be seen that it is possible to reduce the fringe intensity of the fringe flare light 281 as shown in FIG. 14.

Moreover, the aspherical coefficient of the optical system (shown in Exp. 3) was optimized using the determined optical path difference function as the optical path difference function for the diffraction surface, thus designing a diffraction grating lens.

Figure 15:
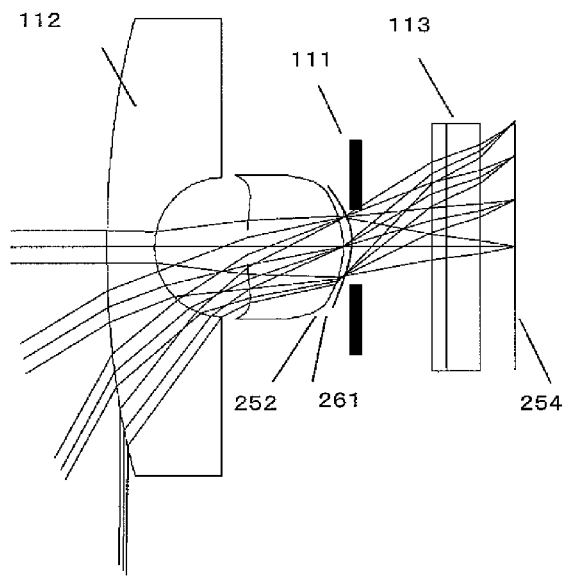
FIG. 15 A cross-sectional view showing an image pickup optical system of Example 1.

FIG. 15 shows an image pickup optical system using the designed diffraction grating lens. This is a two-lens image pickup optical system whose total field angle is 180°, in which the meniscus concave lens 112 is added to the diffraction grating lens. In the diffraction grating 252 of the diffraction grating lens, the height d of the diffraction step is set to 15 um, and it is covered with the optical adjustment film 261, thus reducing the unnecessary-order diffraction light 256. The stop 111 was installed in the diffraction surface portion. Tables 3-1 and 3-2 show data of the optical system.

TABLE 3-1

[Lens data]

| Surface number | Surface Name | Surface Type | Surface interval | Material | Diffraction surface |
| --- | --- | --- | --- | --- | --- |
| Object | | Spherical | Infinite | | |
| 2 | L1R1 | Aspherical coefficient | 1.000 | nd1.53047 vd55.34 | |
| 3 | L1R2 | Aspherical coefficient | 1.928 | | |
| 4 | L2R1 | Aspherical coefficient | 2.00 | nd1.585 vd27.9 | |
| 5 | L2R2 | Aspherical coefficient | 0.030 | nd1.623 vd40 | Diffraction surface |
| 6 | Optical adjustment film | Aspherical coefficient | 0.000 | | |

TABLE 3-1-continued

[Lens data]

| Surface number | Surface Name | Surface Type | Surface interval | Material | Diffraction surface |
|---|---|---|---|---|---|
| Stop surface | | Spherical | 1.862 | | |
| 8 | IRcutFilter | Spherical | 0.300 | BK7_SCHOTT | |
| 9 | CoverGlass | Spherical | 0.700 | BK7_SCHOTT | |
| 10 | | Spherical | 0.680 | | |
| Image | | Spherical | 0.010 | | |

TABLE 3-2

[Aspherical coefficient]

| | Surface number | | | | |
|---|---|---|---|---|---|
| | 2 | 3 | 4 | 5 | 6 |
| Surface Name | L1R1 | L1R2 | L2R1 | L2R2 | Optical adjustment film |
| Y Radius of curvature | 19.45059 | 1.390858 | 4.222286 | −1.73232 | −1.73232 |
| Conic coefficient (κ) | 0 | 0 | −1 | −1 | −1 |
| $4^{th}$-order coefficient (A) | 0.000116 | 0.0006654 | −0.0188 | 0.063189 | 0.063189 |
| $6^{th}$-order coefficient (B) | 0 | 0.009132 | −0.03335 | −0.17086 | −0.17086 |
| $8^{th}$-order coefficient (C) | 0 | −0.01041 | 2.43E−02 | 0.196683 | 0.196683 |
| $10^{th}$-order coefficient (D) | 0 | 0.003699 | −0.01542 | −0.08007 | −0.08007 |
| $12^{th}$-order coefficient (E) | 0 | 0 | 0 | 0 | 0 |
| $14^{th}$-order coefficient (F) | 0 | 0 | 0 | 0 | 0 |

Figure 16:
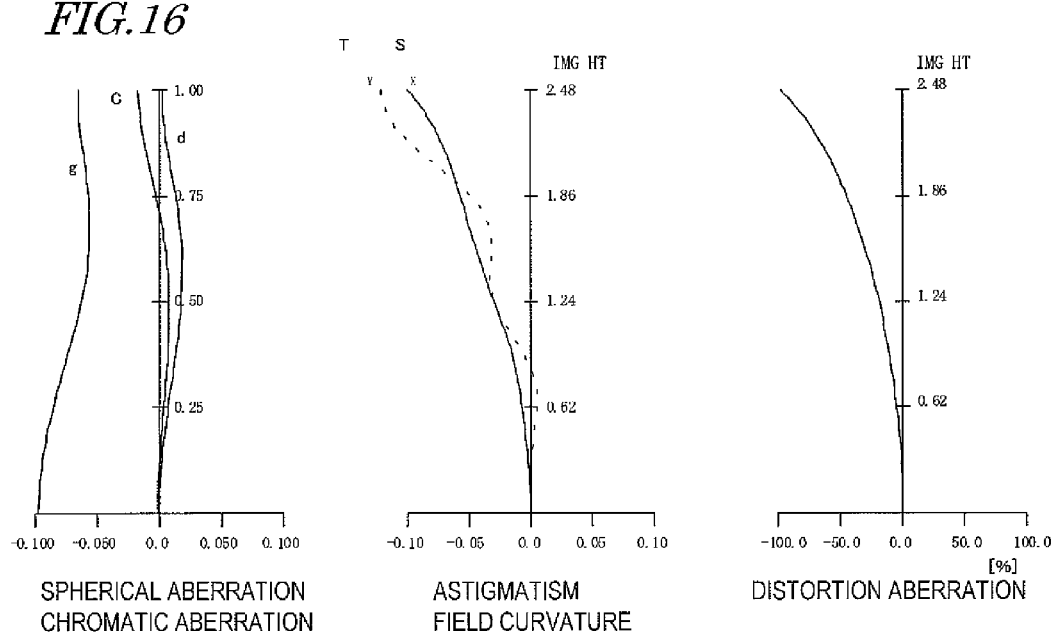
FIG. 16 An aberration diagram of the image pickup optical system of Example 1.
Figure 17:
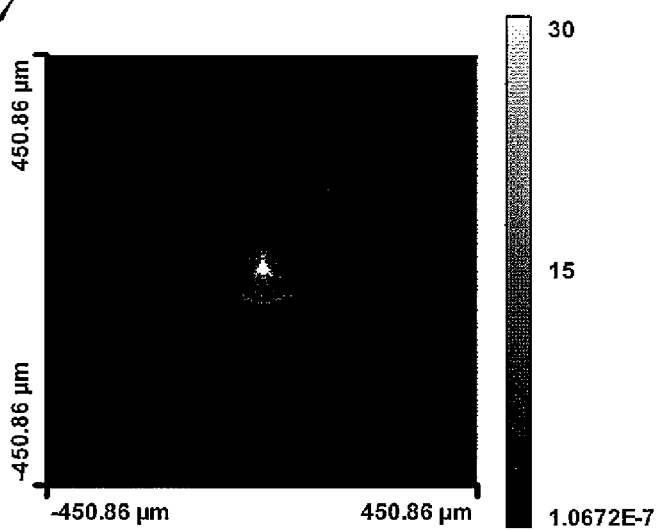
FIG. 17 A spot intensity distribution diagram of the image pickup optical system of Example 1.

FIG. 16 is an aberration diagram of the present example. It can be seen from the spherical aberration diagram that the back focus for C-line is longer than the back focus for g-line. With such a configuration, widths of diffraction zones that can be machined were realized while satisfying Exp. 4. FIG. 17 is an intensity distribution diagram of a spot obtained by passing a beam of a field angle of 60 deg (total field angle: 120 deg) and a wavelength of 640 nm through the optical system of the present example. In addition to the fringe flare light 281, FIG. 17 includes influences of the unnecessary-order diffraction light 256 and aberrations of the optical system. It can be seen from FIG. 17 that the fringe flare light 281 can be reduced.

Example 2

Figure 18:
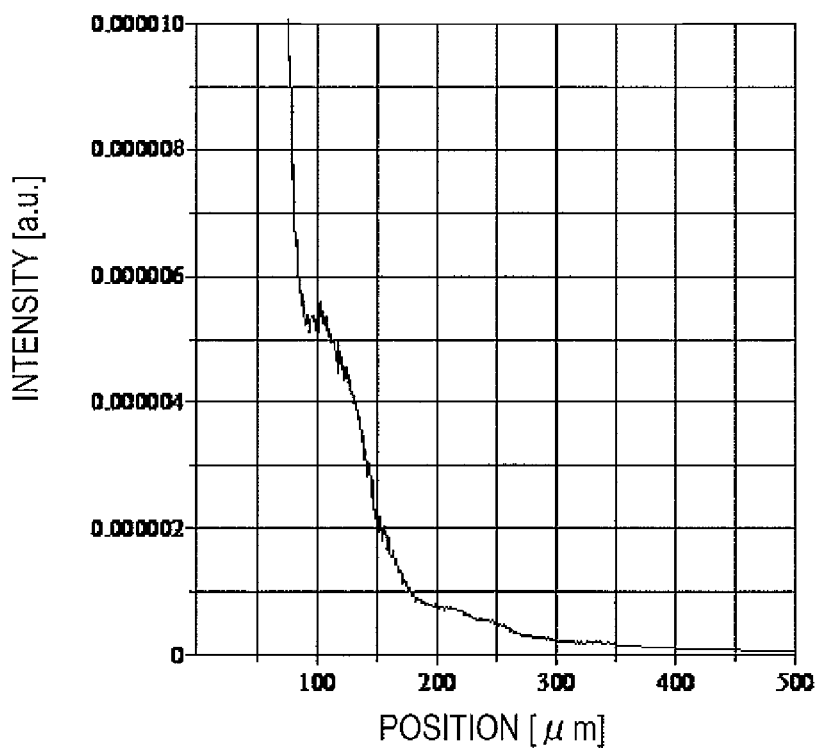
FIG. 18 A diagram showing a cross-sectional intensity distribution of fringe flare light of a diffraction grating lens of Example 2.

As Example 2, a diffraction grating lens obtained by the design method of the present invention was analyzed. First, as Step 1-(1), the widths (pitches) of the diffraction zones within the effective diameter were determined as shown in Table 4. Next, Fraunhofer diffraction images occurring from the determined diffraction zone widths were calculated, and superposed together, thus calculating the fringe flare light 281 (Step 1-(2), (3)). FIG. 18 shows a cross-sectional intensity distribution of the fringe flare light 281 obtained. Table 5 shows the optical path difference function ($\psi(r)$ of Exp. 1) of the diffraction grating of Table 4. The phase function $\phi(r)$ and the optical path difference function $\psi(r)$ are in such a relationship as shown in Exp. 1. In the present example, the designing was done by using only even-number-order coefficients. Specifications of the diffraction grating are shown below.

Fno: 2.8

Value of k of conditional expression: 2.5

Degree of fringe definition: $8.0\times10^{-7}$ (8.0e−7)

TABLE 4

| Zone number | Zone position [mm] | Pitch [mm] |
|---|---|---|
| 1 | 0.162 | 0.162 |
| 2 | 0.228 | 0.066 |
| 3 | 0.279 | 0.051 |
| 4 | 0.321 | 0.043 |
| 5 | 0.359 | 0.038 |
| 6 | 0.393 | 0.034 |
| 7 | 0.425 | 0.032 |
| 8 | 0.454 | 0.030 |
| 9 | 0.482 | 0.028 |
| 10 | 0.509 | 0.027 |
| 11 | 0.534 | 0.026 |
| 12 | 0.559 | 0.025 |
| 13 | 0.583 | 0.024 |
| 14 | 0.605 | 0.023 |
| 15 | 0.628 | 0.022 |
| 16 | 0.649 | 0.021 |
| 17 | 0.669 | 0.020 |
| 18 | 0.689 | 0.020 |
| 19 | 0.708 | 0.019 |
| 20 | 0.726 | 0.018 |

TABLE 5

| Diffraction order | 1 |
|---|---|
| Normalized wavelength | 538 |
| R**2 (a2) | −0.02045 |
| R**4 (a4) | −0.00657 |
| R**6 (a6) | 0.028115 |
| R**8 (a8) | −0.03 |
| R**10 (a10) | 0.000806 |
| R**12 (a12) | 0 |
| R**14 (a14) | 0 |

Example 2 satisfies Exp. 4, and it can be seen that it is possible to reduce the fringe intensity of the fringe flare light 281 as shown in FIG. 18.

Moreover, the aspherical coefficient of the optical system (shown in Exp. 3) was optimized using the determined optical path difference function as the optical path difference function for the diffraction surface, thus designing a diffraction grating lens.

Figure 19:
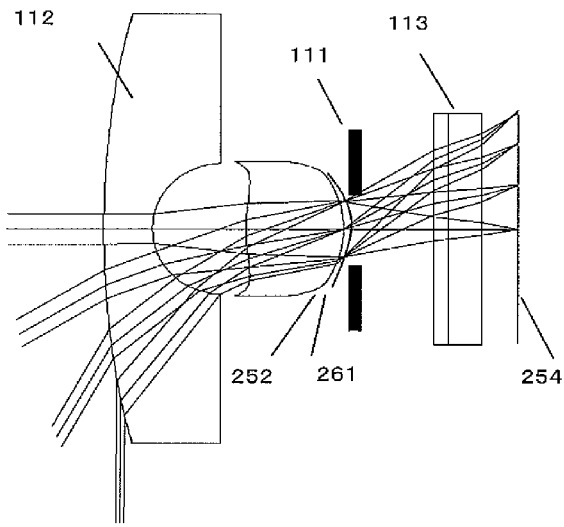
FIG. 19 A cross-sectional view showing an image pickup optical system of Example 2.

FIG. 19 shows an image pickup optical system using the designed diffraction grating lens. This is a two-lens image pickup optical system whose total field angle is 180°, in which the meniscus concave lens 112 is added to the diffraction grating lens. In the diffraction grating 252 of the diffraction grating lens, the height d of the diffraction step is set to 15 um, and it is covered with the optical adjustment film 261, thus reducing the unnecessary-order diffraction light 256. The stop 111 was installed in the diffraction surface portion. Tables 6-1 and 6-2 show data of the optical system.

TABLE 6-1

[Lens data]

| Surface number | Surface Name | Surface Type | Surface interval | Material | Diffraction surface |
|---|---|---|---|---|---|
| Object | | Spherical | Infinite | | |
| 2 | L1R1 | Aspherical coefficient | 1.000 | nd1.53047 vd55.34 | |
| 3 | L1R2 | Aspherical coefficient | 1.928 | | |
| 4 | L2R1 | Aspherical coefficient | 2.00 | nd1.585 vd27.9 | |
| 5 | L2R2 | Aspherical coefficient | 0.030 | nd1.623 vd40 | Diffraction surface |
| 6 | Optical adjustment film | Aspherical coefficient | 0.000 | | |
| Stop surface | | Spherical | 1.862 | | |
| 8 | IRcutFilter | Spherical | 0.300 | BK7_SCHOTT | |
| 9 | CoverGlass | Spherical | 0.700 | BK7_SCHOTT | |
| 10 | | Spherical | 0.680 | | |
| Image | | Spherical | 0.010 | | |

TABLE 6-2

[Aspherical coefficient]

| | Surface number | | | | |
|---|---|---|---|---|---|
| | 2 | 3 | 4 | 5 | 6 |
| Surface Name | L1R1 | L1R2 | L2R1 | L2R2 | optical adjustment film |
| Y Radius of curvature | 19.45059 | 1.390858 | 4.222286 | −1.77507 | −1.77507 |
| Conic coefficient ($\kappa$) | 0 | 0 | −1 | −1 | −1 |
| $4^{th}$-order coefficient (A) | 0.000116 | 0.0006654 | −0.0188 | 0.038583 | 0.038583 |
| $6^{th}$-order coefficient (B) | 0 | 0.009132 | −0.03335 | −0.13899 | −0.13899 |
| $8^{th}$-order coefficient (C) | 0 | −0.01041 | 2.43E−02 | 0.1816 | 0.1816 |
| $10^{th}$-order coefficient (D) | 0 | 0.003699 | −0.01542 | −0.07661 | −0.07661 |
| $12^{th}$-order coefficient (E) | 0 | 0 | 0 | 0 | 0 |
| $14^{th}$-order coefficient (F) | 0 | 0 | 0 | 0 | 0 |

Figure 20:
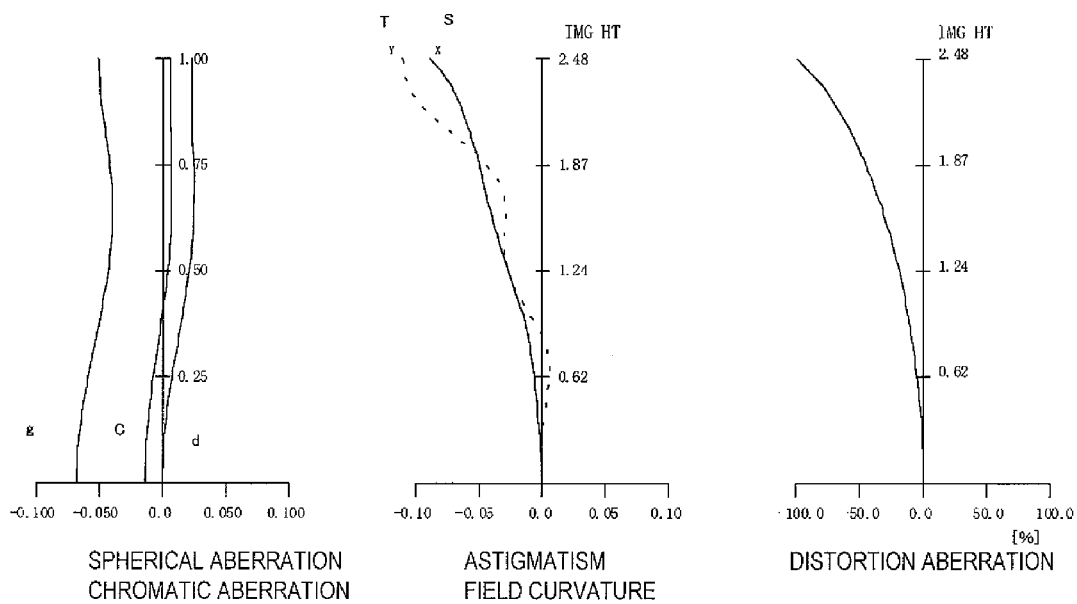
FIG. 20 An aberration diagram of the image pickup optical system of Example 2.
Figure 21:
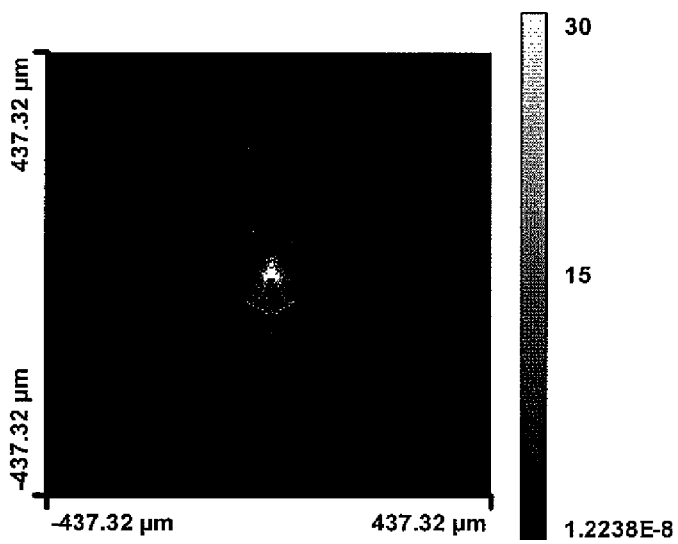
FIG. 21 A spot intensity distribution diagram of the image pickup optical system of Example 2.

FIG. 20 is an aberration diagram of the present example. It can be seen from the spherical aberration diagram that the back focus for C-line is longer than the back focus for g-line. With such a configuration, widths of diffraction zones that can be machined were realized while satisfying Exp. 4. FIG. 21 is an intensity distribution diagram of a spot obtained by passing a beam of a field angle of 60 deg (total field angle: 120 deg) and a wavelength of 640 nm through the optical system of the present example. In addition to the fringe flare light 281, FIG. 21 includes influences of the unnecessary-order diffraction light 256 and aberrations of the optical system. It can be seen from FIG. 21 that the fringe flare light 281 can be reduced.

Example 3

Figure 22:
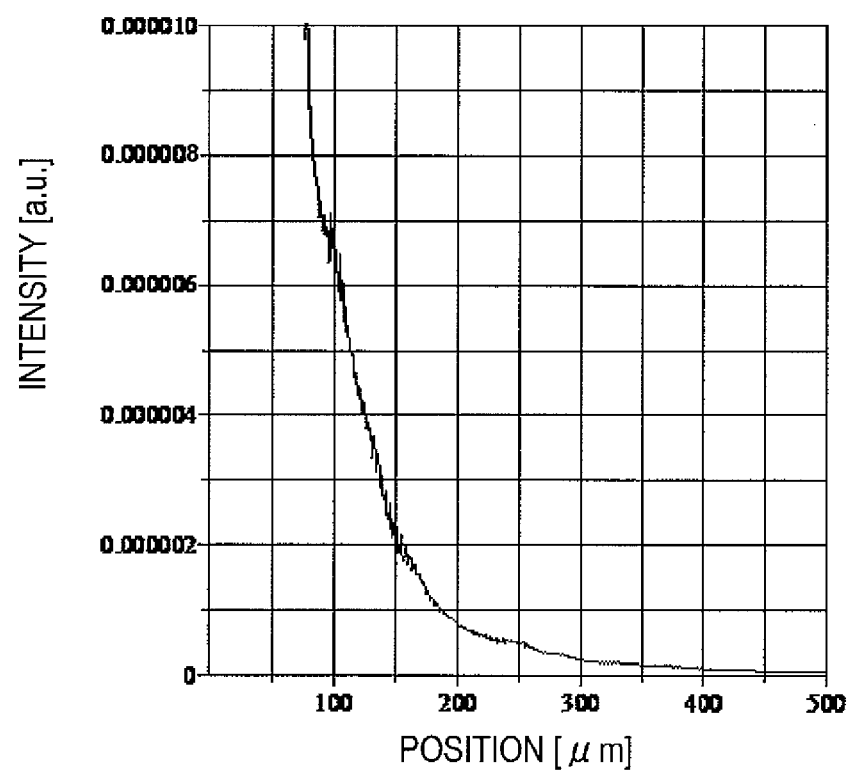
FIG. 22 A cross-sectional intensity distribution diagram of fringe flare light of a diffraction grating lens of Example 3.

As Example 3, a diffraction grating lens obtained by the design method of the present invention was analyzed. First, as Step 1-(1), the widths of the diffraction zones within the effective diameter were determined as shown in Table 7. Next, Fraunhofer diffraction images occurring from the determined diffraction zone widths were calculated, and superposed together, thus calculating the fringe flare light 281 (Step 1-(2), (3)). FIG. 22 shows a cross-sectional intensity distribution of the fringe flare light 281 obtained. Table 8 shows the optical path difference function ($\psi(r)$ of Exp. 1) of the diffraction grating of Table 7. The phase function $\phi(r)$ and the optical path difference function $\psi(r)$ are in such a relationship as shown in Exp. 1. In the present example, the designing was done by using only even-number-order coefficients. Specifications of the diffraction grating are shown below.

Fno: 2.8
Value of k of conditional expression: 4.2
Degree of fringe definition: $8.3 \times 10^{-7}$ (8.3e−7)

TABLE 7

| Zone number | Zone position [mm] | Pitch [mm] |
|---|---|---|
| 1 | 0.159 | 0.159 |
| 2 | 0.225 | 0.066 |
| 3 | 0.276 | 0.051 |
| 4 | 0.319 | 0.043 |
| 5 | 0.358 | 0.039 |
| 6 | 0.398 | 0.035 |
| 7 | 0.426 | 0.033 |
| 8 | 0.458 | 0.031 |
| 9 | 0.488 | 0.030 |
| 10 | 0.516 | 0.029 |
| 11 | 0.544 | 0.028 |
| 12 | 0.570 | 0.026 |
| 13 | 0.596 | 0.025 |
| 14 | 0.620 | 0.024 |
| 15 | 0.643 | 0.023 |
| 16 | 0.665 | 0.022 |
| 17 | 0.686 | 0.021 |
| 18 | 0.705 | 0.019 |
| 19 | 0.723 | 0.018 |
| 20 | 0.740 | 0.017 |

TABLE 8

| | |
|---|---|
| Diffraction order | 1 |
| Normalized wavelength | 538 |
| R**2 (a2) | −0.0213 |
| R**4 (a4) | −0.0005 |
| R**6 (a6) | 0.028115 |
| R**8 (a8) | −0.04 |
| R**10 (a10) | 0.000806 |
| R**12 (a12) | 0 |
| R**14 (a14) | 0 |

Example 3 satisfies Exp. 4, and it can be seen that it is possible to reduce the fringe intensity of the fringe flare light 281 as shown in FIG. 22.

Moreover, the aspherical coefficient of the optical system (shown in Exp. 3) was optimized using the determined optical path difference function as the optical path difference function for the diffraction surface, thus designing a diffraction grating lens.

Figure 23:
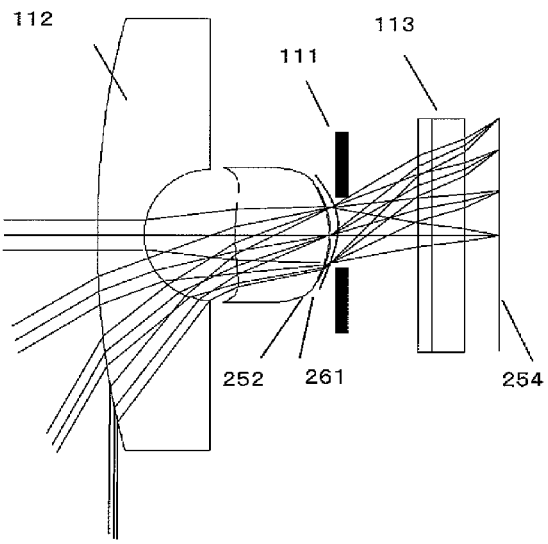
FIG. 23 A cross-sectional view showing an image pickup optical system of Example 3.

FIG. 23 shows an image pickup optical system using the designed diffraction grating lens. This is a two-lens image pickup optical system whose total field angle is 180°, in which the meniscus concave lens 112 is added to the diffraction grating lens. In the diffraction grating 252 of the diffraction grating lens, the height d of the diffraction step is set to 15 um, and it is covered with the optical adjustment film 261, thus reducing the unnecessary-order diffraction light 256. The stop 111 was installed in the diffraction surface portion. Tables 9-1 and 9-2 show data of the optical system.

TABLE 9-1

[Lens data]

| Surface number | Surface Name | Surface Type | Surface interval | Material | Diffraction surface |
|---|---|---|---|---|---|
| Object | | Spherical | Infinite | | |
| 2 | L1R1 | Aspherical coefficient | 1.000 | nd1.53047 vd55.34 | |
| 3 | L1R2 | Aspherical coefficient | 1.928 | | |
| 4 | L2R1 | Aspherical coefficient | 2.00 | nd1.585 vd27.9 | |
| 5 | L2R2 | Aspherical coefficient | 0.030 | nd1.623 vd40 | Diffraction surface |
| 6 | Optical adjustment film | Aspherical coefficient | 0.000 | | |
| Stop surface | | Spherical | 1.862 | | |
| 8 | IRcutFilter | Spherical | 0.300 | BK7_SCHOTT | |
| 9 | CoverGlass | Spherical | 0.700 | BK7_SCHOTT | |
| 10 | | Spherical | 0.680 | | |
| Image | | Spherical | 0.010 | | |

TABLE 9-2

[Aspherical coefficient]

| | Surface number | | | | |
|---|---|---|---|---|---|
| | 2 | 3 | 4 | 5 | 6 |
| Surface Name | L1R1 | L1R2 | L2R1 | L2R2 | Optical adjustment film |
| Y Radius of curvature | 19.45059 | 1.390858 | 4.222286 | −1.78389 | −1.78389 |
| Conic coefficient (κ) | 0 | 0 | −1 | −1 | −1 |
| $4^{th}$-order coefficient (A) | 0.000116 | 0.0006654 | −0.0188 | 0.027409 | 0.027409 |
| $6^{th}$-order coefficient (B) | 0 | 0.009132 | −0.03335 | −0.13064 | −0.13064 |
| $8^{th}$-order coefficient (C) | 0 | −0.01041 | 2.43E-02 | 0.190098 | 0.190098 |
| $10^{th}$-order coefficient (D) | 0 | 0.003699 | −0.01542 | −0.07979 | −0.07979 |
| $12^{th}$-order coefficient (E) | 0 | 0 | 0 | 0 | 0 |
| $14^{th}$-order coefficient (F) | 0 | 0 | 0 | 0 | 0 |

Figure 24:
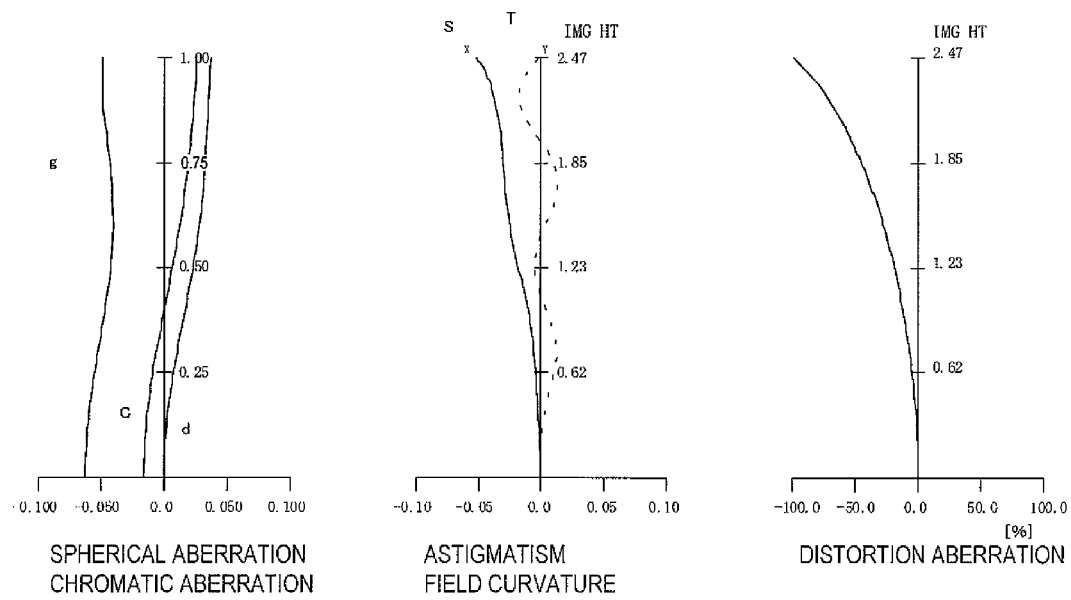
FIG. 24 An aberration diagram of an image pickup optical system of Example 3.
Figure 25:
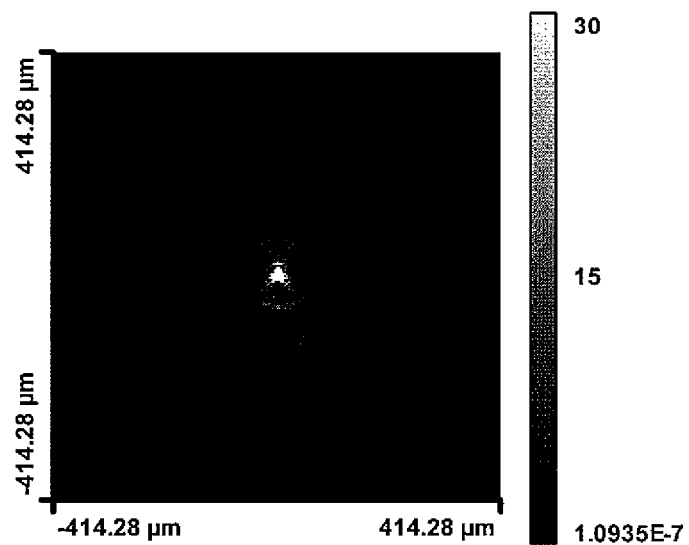
FIG. 25 A spot intensity distribution diagram of the image pickup optical system of Example 3.

FIG. 24 is an aberration diagram of the present example. It can be seen from the spherical aberration diagram that the back focus for C-line is longer than the back focus for g-line. With such a configuration, widths of diffraction zones that can be machined were realized while satisfying Exp. 4. FIG. 25 is an intensity distribution diagram of a spot obtained by passing a beam of a field angle of 60 deg (total field angle: 120 deg) and a wavelength of 640 nm through the optical system of the present example. In addition to the fringe flare light 281, FIG. 25 includes influences of the unnecessary-order diffraction light 256 and aberrations of the optical system. It can be seen from FIG. 25 that the fringe flare light 281 can be reduced.

Comparative Example 1

Figure 26:
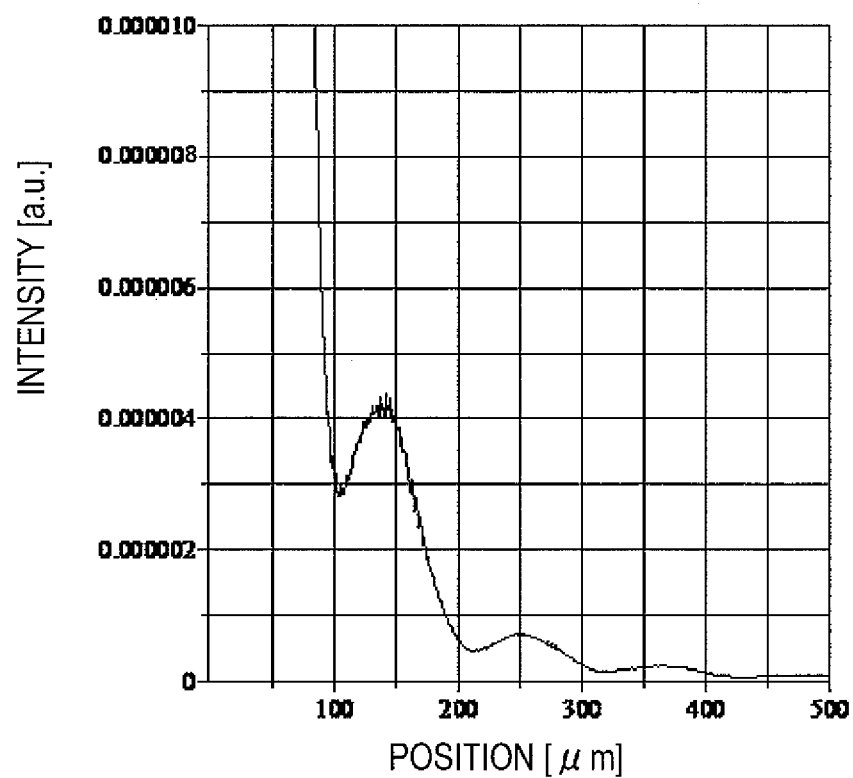
FIG. 26 A diagram showing a cross-sectional intensity distribution of fringe flare light of a diffraction grating lens according to Comparative Example 1.

As Comparative Example 1, such a diffraction grating lens as described below was analyzed. First, as Step 1-(1), the widths (pitches) of the diffraction zones within the effective diameter were determined as shown in Table 10. In this process, as can be seen from Table 10, the widths (pitches) of the diffraction zones were set so that they are equal in the peripheral portion of the lens. Next, Fraunhofer diffraction images occurring from the determined diffraction zone widths were calculated, and superposed together, thus calculating the fringe flare light 281 (Step 1-(2), (3)). FIG. 26 shows a cross-sectional intensity distribution of the fringe flare light 281 obtained. Table 11 shows the optical path difference function ($\psi(r)$ of Exp. 1) of the diffraction grating of Table 10. The relationship between the phase function $\phi(r)$ and the optical path difference function $\psi(r)$ can be converted as shown in Exp. 1, and the designing was done in Comparative Example 1 by using only even-number-order coefficients. Specifications of the diffraction grating are shown below.

Fno: 2.8
Value of k of conditional expression: 0.070
Degree of fringe definition: $2.2 \times 10^{-6}$ (2.2e−6)

TABLE 10

| Zone number | Zone position [mm] | Pitch [mm] |
|---|---|---|
| 1 | 0.141 | 0.141 |
| 2 | 0.199 | 0.058 |
| 3 | 0.243 | 0.044 |
| 4 | 0.280 | 0.037 |
| 5 | 0.313 | 0.033 |
| 6 | 0.343 | 0.030 |
| 7 | 0.370 | 0.027 |
| 8 | 0.396 | 0.026 |
| 9 | 0.420 | 0.024 |
| 10 | 0.443 | 0.023 |
| 11 | 0.465 | 0.022 |
| 12 | 0.486 | 0.021 |
| 13 | 0.507 | 0.021 |
| 14 | 0.527 | 0.020 |
| 15 | 0.547 | 0.020 |
| 16 | 0.566 | 0.019 |
| 17 | 0.585 | 0.019 |
| 18 | 0.604 | 0.019 |
| 19 | 0.622 | 0.018 |
| 20 | 0.640 | 0.018 |
| 21 | 0.658 | 0.018 |
| 22 | 0.677 | 0.018 |
| 23 | 0.694 | 0.018 |
| 24 | 0.712 | 0.018 |
| 25 | 0.730 | 0.018 |

TABLE 11

| Diffraction order | 1 |
|---|---|
| Normalized wavelength | 538 |
| R**2 (a2) | −0.02707 |
| R**4 (a4) | −0.00657 |
| R**6 (a6) | 0.028115 |
| R**8 (a8) | −0.01783 |
| R**10 (a10) | 0.000806 |
| R**12 (a12) | 0 |
| R**14 (a14) | 0 |

It can be seen that since Comparative Example 1 does not satisfy Exp. 4, fringes of the fringe flare light 281 are occurring in a clearly-defined manner as shown in FIG. 26.

Moreover, the aspherical coefficient of the optical system (shown in Exp. 3) was optimized using the determined optical path difference function as the optical path difference function for the diffraction surface, thus designing a diffraction grating lens.

Figure 27:
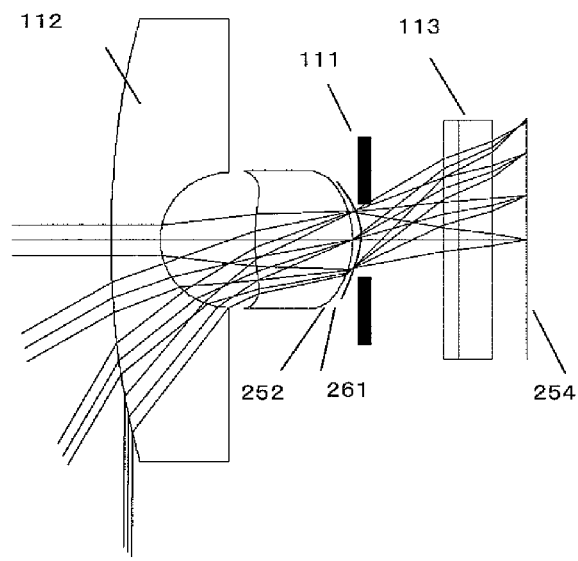
FIG. 27 A cross-sectional view showing an image pickup optical system of Comparative Example 1.

FIG. 27 shows an image pickup optical system using the designed diffraction grating lens. This is a two-lens image pickup optical system whose total field angle is 180°, in which the meniscus concave lens 112 is added to the diffraction grating lens. In the diffraction grating 252 of the diffraction grating lens, the height d of the diffraction step is set to 15 um, and it is covered with the optical adjustment film 261, thus reducing the unnecessary-order diffraction light 256. The stop 111 was installed in the diffraction surface portion. Tables 12-1 and 12-2 show data of the optical system.

TABLE 12-1

[Lens data]

| Surface number | Surface Name | Surface Type | Surface interval | Material | Diffraction surface |
|---|---|---|---|---|---|
| Object | | Spherical | Infinite | | |
| 2 | L1R1 | Aspherical coefficient | 1.000 | nd1.53047 vd55.34 | |
| 3 | L1R2 | Aspherical coefficient | 1.928 | | |
| 4 | L2R1 | Aspherical coefficient | 2.00 | nd1.585 vd27.9 | |
| 5 | L2R2 | Aspherical coefficient | 0.030 | nd1.623 vd40 | Diffraction surface |
| 6 | Optical adjustment film | Aspherical coefficient | 0.000 | | |
| Stop surface | | Spherical | 1.862 | | |
| 8 | IRcutFilter | Spherical | 0.300 | BK7_SCHOTT | |
| 9 | CoverGlass | Spherical | 0.700 | BK7_SCHOTT | |
| 10 | | Spherical | 0.680 | | |
| Image | | Spherical | 0.010 | | |

TABLE 12-1

[Aspherical coefficient]

| | Surface number | | | | |
|---|---|---|---|---|---|
| | 2 | 3 | 4 | 5 | 6 |
| Surface Name | L1R1 | L1R2 | L2R1 | L2R2 | Optical adjustment film |
| Y Radius of curvature | 19.45059 | 1.390858 | 4.222286 | −1.82927 | −1.82927 |
| Conic coefficient (κ) | 0 | 0 | −1 | −1 | −1 |
| 4th-order coefficient (A) | 0.000116 | 0.0006654 | −0.0188 | 0.028371 | 0.028371 |
| 6th-order coefficient (B) | 0 | 0.009132 | −0.03335 | −0.10578 | −0.10578 |
| 8th-order coefficient (C) | 0 | −0.01041 | 2.43E-02 | 0.109618 | 0.109618 |
| 10th-order coefficient (D) | 0 | 0.003699 | −0.01542 | −0.03998 | −0.03998 |
| 12th-order coefficient (E) | 0 | 0 | 0 | 0 | 0 |
| 14th-order coefficient (F) | 0 | 0 | 0 | 0 | 0 |

Figure 28:
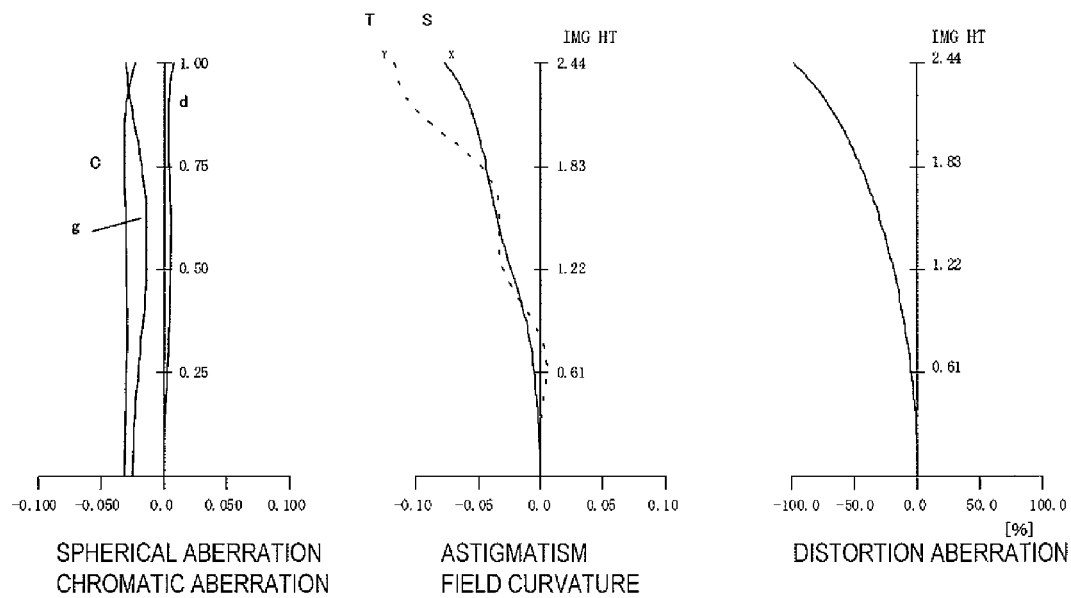
FIG. 28 An aberration diagram of the image pickup optical system of Comparative Example 1.
Figure 29:
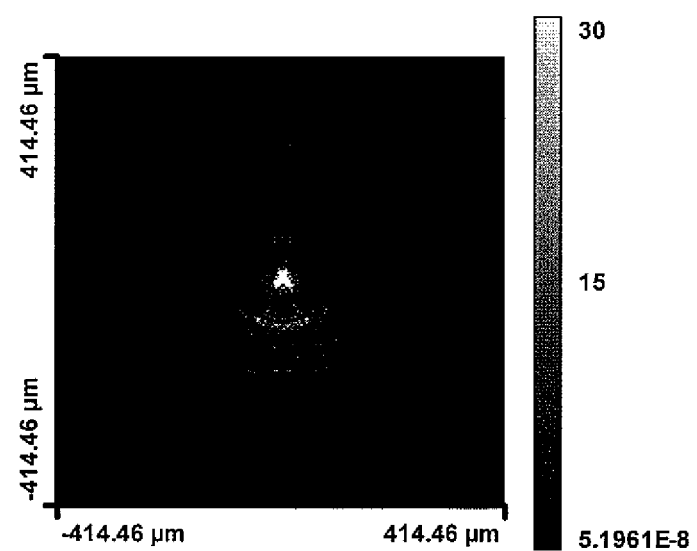
FIG. 29 A spot intensity distribution diagram of the image pickup optical system of Comparative Example 1.

FIG. 28 is an aberration diagram of Comparative Example 1. It can be seen from the spherical aberration diagram that the back focus for g-line is longer than the back focus for C-line. FIG. 29 is an intensity distribution diagram of a spot obtained by passing a beam of a field angle of 60 deg (total field angle: 120 deg) and a wavelength of 640 nm through the optical system of Comparative Example 1. In addition to the fringe flare light 281, FIG. 29 includes influences of the unnecessary-order diffraction light 256 and aberrations of the optical system. It can be seen from FIG. 29 that the fringe flare light 281 has occurred.

Note that as described above, the occurring fringe flare light will all have the same distribution if the diffraction zones of diffraction gratings have the same widths. Therefore, although Examples 1 to 3 and Comparative Example 1 represents results obtained by performing analysis using an adhesion-type diffraction grating lens having an optical adjustment layer on the surface of the diffraction grating, even when a simple-type or stack-type diffraction grating lens is used, it is possible to similarly suppress the degree of fringe definition of the fringe flare light 281 to be $10^{-6}$ mm$^{-2}$ or less if the widths of the diffraction zones satisfy Exp. 4, and the degree of fringe definition of the fringe flare light 281 will be significantly high exceeding $10^{-6}$ mm$^{-2}$ if they do not satisfy Exp. 4.

INDUSTRIAL APPLICABILITY

Diffraction grating lenses designed by the design method of the present invention has a function of reducing the fringe flare light and are useful particularly as high-quality cameras.

REFERENCE SIGNS LIST

21 Slope surface
22 Tip portion
23 Base portion
24 Spread-out of wave front
111 Stop
112 Meniscus concave lens
113 Cover glass and filter
231 Image processing apparatus
241 Step height
251 Lens base (diffraction grating lens)
252 Diffraction grating
253 Optical axis
254 Image pickup element
255 First-order diffraction light
256 Unnecessary-order diffraction light
261 Optical adjustment film
262 Step surface
271 Diffraction zone
281 Fringe flare light
312, 312' Diffraction grating 313 Point at which optical axis and lens intersect with each other
321, 321B Base
322 Base
323 Gap
324 Optical adjustment layer
355, 355' Optical element

The invention claimed is:

1. A method for designing a diffraction grating lens having a diffraction grating composed of a plurality of diffraction zones, the method comprising the steps of:
 (a) determining respective widths of the plurality of diffraction zones; and
 (b) determining an aspherical coefficient of a diffraction surface on which the diffraction grating is provided while the determined respective widths of the plurality of diffraction zones are kept unchanged, after the step (a).

2. The method for designing a diffraction grating lens of claim 1, wherein in the step (a), the respective widths of the plurality of diffraction zones are set to be non-uniform.

3. The method for designing a diffraction grating lens of claim 1, wherein the step (a) includes a step (a1)) of setting widths of the diffraction zones while changing the widths of the diffraction zones by changing a coefficient of a phase function.

4. The method for designing a diffraction grating lens of claim 3, wherein the step (a) includes:
 a step (a2) of calculating a Fraunhofer diffraction image occurring from each of the plurality of diffraction zones;
 a step (a3) of estimating an intensity of fringe flare light by superposing together the Fraunhofer diffraction images occurring from the plurality of diffraction zones; and
 a step (a4) of determining the widths of the plurality of diffraction zones based on the fringe flare light.

5. The method for designing a diffraction grating lens of claim 1, wherein:
 the diffraction grating includes q diffraction zones; and
 the repsective widths of the plurality of diffraction zones are determined in the step (a) so that at least one m satisfying 3<m≤q satisfies Exp. 4 below, where $P_1$, $P_2$, $P_{m-1}$ and $P_m$ denote widths of $1^{st}$, $2^{nd}$, $m-1^{th}$ and $m^{th}$ diffraction zones, respectively, counting from an optical axis $$k = \left(\frac{1}{P_{m-1}} \cdot \frac{P_{m-1} - P_m}{P_{m-1} \cdot P_m}\right) \Big/ \left(\frac{1}{P_1} \cdot \frac{P_1 - P_2}{P_1 \cdot P_2}\right) > 1.6. \quad \text{[Exp. 4]}$$

6. The method for designing a diffraction grating lens of claim 1, wherein the diffraction grating is formed only on one surface.

7. A method for manufacturing a diffraction grating lens, comprising designing a diffraction grating lens in accordance with the method of claim 1; and manufacturing the diffraction grating lens based on the design.

8. A method for designing an image pickup optical system, the image pickup optical system comprising:
 a diffraction grating lens having a diffraction grating composed of a plurality of diffraction zones;
 a spherical surface or an aspherical lens; and
 a stop, the method comprising the steps of:
 (a) determining respective widths of the plurality of diffraction zones; and
 (b) determining an aspherical coefficient of a diffraction surface on which the diffraction grating is provided while the determined respective widths of the plurality of diffraction zones are kept unchanged, after the step (a).

9. The method for designing an image pickup optical system of claim 8, wherein the respective widths of the plurality of diffraction zones are determined in the step (a) so as to satisfy Exp. 13 below, where $P_1$ and $P_2$ denote the widths of $1^{st}$ and $2^{nd}$ diffraction zones counting from the optical axis side, $P_{max}$ denotes the width of the diffraction zone at a position of an effective diameter $h_{max}$, and $P_{max-1}$ denotes the width of the second diffraction zone counting from the position of the effective diameter $h_{max}$ toward an optical axis side $$k = \left(\frac{1}{P_{max-1}} \cdot \frac{P_{max-1} - P_{max}}{P_{max-1} \cdot P_{max}}\right) \Big/ \left(\frac{1}{P_1} \cdot \frac{P_1 - P_2}{P_1 \cdot P_2}\right) > 1.6. \quad \text{[Exp. 13]}$$

10. The method for designing an image pickup optical system of claim 8, wherein the respective widths of the plurality of diffraction zones are set to be non-uniform in the step (a).

11. The method for designing an image pickup optical system of claim 8, wherein the step (a) includes a step (a1)) of setting the widths of the diffraction zones while changing the widths of the diffraction zones by changing a coefficient of a phase function.

12. The method for designing an image pickup optical system of claim 11, the step (a) includes the steps of:
 (a2) calculating Fraunhofer diffraction images occurring from the plurality of diffraction zones;
 (a3) estimating an intensity of fringe flare light by superposing together the Fraunhofer diffraction images occurring from the plurality of diffraction zones; and
 (a4) determining the widths of the plurality of diffraction zones based on the fringe flare light.

13. A method for manufacturing an image pickup optical system, comprising designing an image pickup optical system in accordance with the method of claim 8; and manufacturing the image pickup optical system based on the design.

* * * * *